US011774650B2

(12) United States Patent
Tashiro et al.

(10) Patent No.: US 11,774,650 B2
(45) Date of Patent: Oct. 3, 2023

(54) DISPLAY BODY

(71) Applicant: TOPPAN PRINTING CO., LTD., Tokyo (JP)

(72) Inventors: Tomoko Tashiro, Tokyo (JP); Keitaro Sugihara, Tokyo (JP); Toshiki Toda, Tokyo (JP)

(73) Assignee: TOPPAN PRINTING CO., LTD., Tokyo (JP)

( * ) Notice: Subject to any disclaimer, the term of this patent is extended or adjusted under 35 U.S.C. 154(b) by 0 days.

(21) Appl. No.: 17/836,991

(22) Filed: Jun. 9, 2022

(65) Prior Publication Data

US 2022/0299684 A1 Sep. 22, 2022

Related U.S. Application Data

(63) Continuation of application No. 16/255,736, filed on Jan. 23, 2019, now Pat. No. 11,372,141, and a
(Continued)

(30) Foreign Application Priority Data

Jul. 25, 2016 (JP) .................................. 2016-145599
Mar. 14, 2017 (JP) .................................. 2017-048905

(51) Int. Cl.
*G02B 5/18* (2006.01)
*G09F 19/14* (2006.01)
(Continued)

(52) U.S. Cl.
CPC ......... *G02B 5/1842* (2013.01); *B42D 25/328* (2014.10); *G09F 19/12* (2013.01); *G09F 19/14* (2013.01)

(58) Field of Classification Search
CPC .... B42D 25/328; B42D 25/29; B42D 25/324; B42D 25/30; B42D 25/333; B42D 25/40;
(Continued)

(56) References Cited

U.S. PATENT DOCUMENTS

2008/0258456 A1  10/2008 Rahm et al.
2009/0162756 A1* 6/2009 Staub ................... B42D 25/328
  430/2
(Continued)

FOREIGN PATENT DOCUMENTS

DE   102005061749 A1   7/2007
EP      3000613 A1     3/2016
(Continued)

OTHER PUBLICATIONS

Machine Translation of WO-2012055505-A1 (Year: 2012).*
(Continued)

*Primary Examiner* — Darryl J Collins
*Assistant Examiner* — Matthew Y Lee
(74) *Attorney, Agent, or Firm* — SQUIRE PATTON BOGGS (US) LLP

(57) ABSTRACT

A display body includes a display surface including a plurality of display region groups. Each display region includes at least one reflection surface that is configured to reflect light incident on the display surface toward an area including a corresponding one of reflection directions that are associated with the respective display region groups. Each display region group is configured to form an image unique to the display region group in a corresponding one of the reflection directions through reflection of light on the reflection surfaces in the display region group. The display region groups are configured to form, in two adjacent ones of the reflection directions, different images that have a interrelation between each other.

8 Claims, 23 Drawing Sheets

Related U.S. Application Data continuation of application No. PCT/JP2017/026885, filed on Jul. 25, 2017.

(51) Int. Cl.
*G09F 19/12* (2006.01)
*B42D 25/328* (2014.01)

(58) Field of Classification Search
CPC ...... G02B 5/1809; G02B 5/0221; G02B 5/02; G02B 5/0257; G02B 5/0236; G02B 5/0263; G02B 5/0284; G03H 1/0011; G03H 1/0248
See application file for complete search history.

(56) References Cited

U.S. PATENT DOCUMENTS

| | | | |
|---|---|---|---|
| 2012/0319395 A1 | 12/2012 | Fuhse et al. | |
| 2013/0063826 A1 | 3/2013 | Hoffmuller et al. | |
| 2013/0093172 A1* | 4/2013 | Fuhse | B42D 25/328 283/67 |
| 2014/0268261 A1* | 9/2014 | Kubo | G02B 5/18 359/2 |
| 2017/0021660 A1* | 1/2017 | Petiton | B42D 25/324 |
| 2018/0106932 A1* | 4/2018 | Schill | G02B 5/0257 |

FOREIGN PATENT DOCUMENTS

| | | |
|---|---|---|
| EP | 3000614 A1 | 3/2016 |
| JP | 2004-085681 A | 3/2004 |
| JP | 2009-532726 A | 9/2009 |
| JP | 2014-021445 A | 2/2014 |
| WO | WO 2011/066991 A2 | 6/2011 |
| WO | WO 2011/138039 A1 | 11/2011 |
| WO | WO 2012/055506 A1 | 5/2012 |
| WO | WO-2012055505 A1 * | 5/2012 ............ B42D 25/00 |

OTHER PUBLICATIONS

International Preliminary Report on Patentability dated Jan. 29, 2019 for International Patent Application No. PCT/JP2017/026885, 5 pages.
Extended European Search Report dated Feb. 6, 2020 for European Patent Application No. 17834322.4, with translation, 5 pages.
Notice of Reasons for Refusal dated May 11, 2021 for Japanese Patent Application No. 2018-529917, with translation, 10 pages.

* cited by examiner

Fig.3A  Fig.3B  Fig.3C  Fig.3D
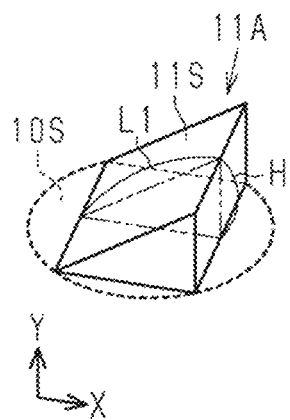 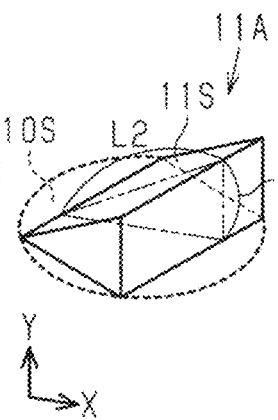 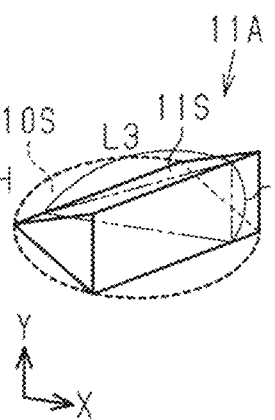 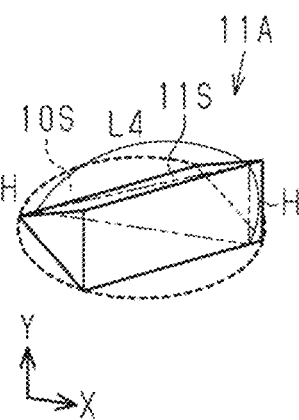
Fig.4A  Fig.4B  Fig.4C  Fig.4D
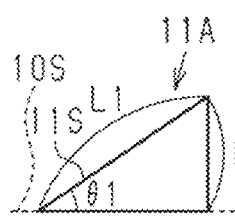 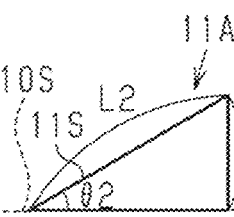 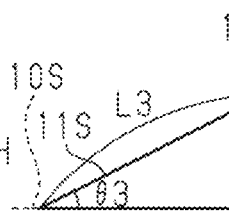 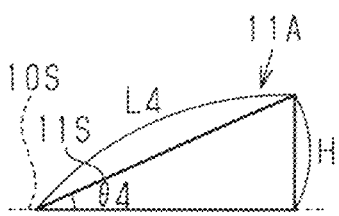

Fig.34A
Fig.34B
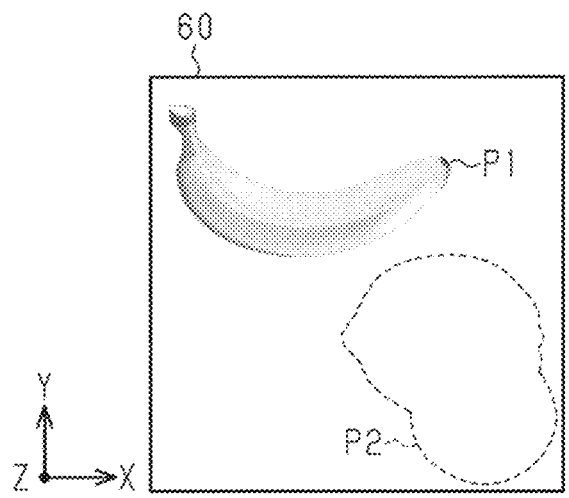
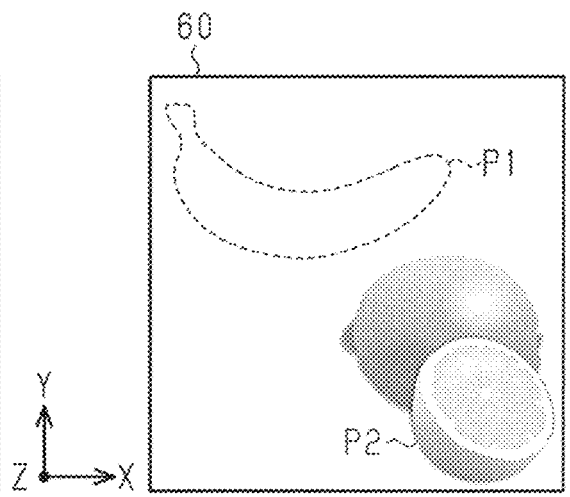
Fig.35A
Fig.35B
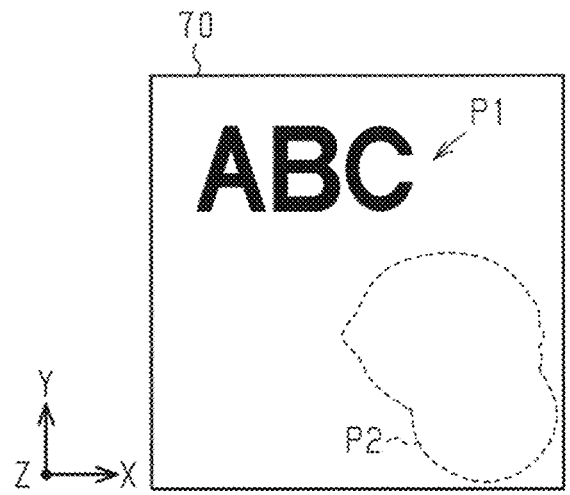
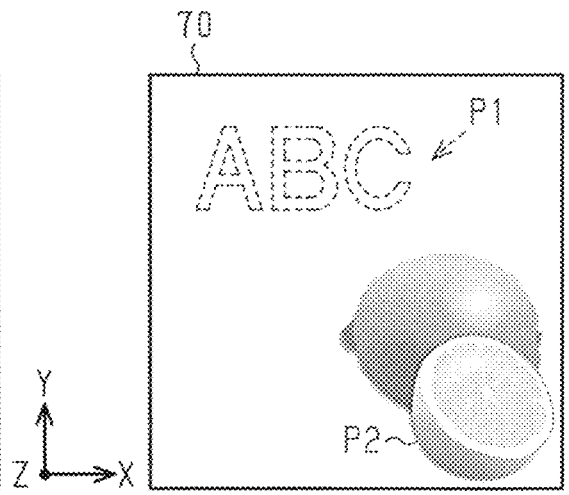

DISPLAY BODY

CROSS-REFERENCE TO RELATED APPLICATIONS

This application is a Continuation of U.S. patent application Ser. No. 16/255,736 filed Jan. 23, 2019, which is a Continuation of International Application No. PCT/JP2017/026885, filed Jul. 25, 2017, which claims priority to, and the benefit of, Japanese Patent Application No. JP2017-048905, filed Mar. 14, 2017 and Japanese Patent Application No. JP2016-145599, filed Jul. 25, 2016, the entire contents of each of which are herein incorporated by reference in their entirety for all purposes.

BACKGROUND

The present disclosure relates to a display body that displays an image through reflection of light.

Various objects such as certification documents, securities, banknotes are required to be counterfeit-resistant. Techniques to increase difficulty in counterfeiting an object include attaching a counterfeit-resistant display body to the object.

For example, Japanese Laid-Open Patent Publication No. 2004-85681 describes a display body that records a latent image of a meaningful shape, such as a character, by using a diffraction grating that produces diffracted light in a reflection direction oblique to the display surface. The latent image recorded by the diffraction grating is difficult to perceive when viewed in the direction of the normal to the display surface. However, the latent image recorded by the diffraction grating is clearly perceived when the display surface is viewed along the reflection direction.

However, the display body of Patent Document 1 merely displays the latent image, which is recorded by the diffraction grating, when the display surface is viewed along a reflection direction. In recent years, various objects are sought to have aesthetic appearances, and there is a high demand for display bodies with improved aesthetic appearance.

SUMMARY

To address this need, it is an objective of the present disclosure to provide a display body with an improved aesthetic appearance.

To achieve the foregoing objective, a display body is provided that includes a display surface including a plurality of display region groups, each including a plurality of display regions. Each display region includes at least one reflection surface that is configured to reflect light incident on the display surface toward an area including a corresponding one of reflection directions that are associated with the respective display region groups. Each display region group is configured to form an image unique to the display region group in a corresponding one of the reflection directions through reflection of light on the reflection surfaces in the display region group. The display region groups are configured to form, in two adjacent ones of the reflection directions, different images that have a interrelation between each other.

With this configuration, when the observation direction is shifted, different images having a interrelation between each other are perceived. This improves the aesthetic appearance of the display body.

In the above-described configuration, the images having the interrelation may each include an element image, and the element images are identical in type and different from each other in at least one of position of the element images, shape of the element images, size of the element images, light and dark of the element images, and shade of the element images.

This configuration allows the interrelation between the images to be easily recognized by the observer when the observation direction is changed. This increases the advantage of displaying images that have interrelated but different contents according to the reflection directions.

In the above-described configuration, the interrelation may include continuous variations, along a sequence of the reflection directions, in at least one of position of the element images, shape of the element images, light and dark of the element images, size of the element images, and shade of the element images in the images.

This configuration continuously varies the content of the image when the reflection direction varies continuously. This further improves the aesthetic appearance of the display body.

In the above-described configuration, the two adjacent reflection directions may be a first reflection direction and a second reflection direction. The plurality of display region groups may include a first display region group configured to form an image in the first reflection direction, and a second display region group configured to form an image in the second reflection direction. The display regions of the first display region group may be adjacent to the display regions of the second display region group.

In this configuration, the display regions for displaying the images having the interrelation are adjacent to each other, allowing the reflection surfaces adjacent to each other to have similar structures. This reduces the load required to manufacture the display body.

In the above-described configuration, the plurality of reflection surfaces may include reflection surfaces that form different angles with the display surface and reflection surfaces having different orientations.

This configuration includes reflection surfaces that form different angles with the display surface and reflection surfaces having different orientations. This facilitates establishing an association between a display region group and an intended reflection direction.

The above-described configuration may include a plurality of pixels located on the display surface. Each display region may be one of the pixels.

This configuration allows the structure of the display regions to be designed based on a raster image, which is an image formed by a collection of pixels.

The above-described configuration may include a substrate and a reflection layer covering the substrate. The reflection layer may include the reflection surfaces of the display regions.

This configuration can make the intensity of the reflected light traveling in the reflection direction different from that of the light reflected by the substrate.

BRIEF DESCRIPTION OF THE DRAWINGS

FIGS. 3A to 3D are perspective views showing the structures of pixels associated with different tones in the image to be displayed.

FIGS. 4A to 4D are cross-sectional views showing the cross-sectional structures of the pixels shown in FIGS. 3A to 3D.

FIGS. 34A and 34B are diagrams for illustrating the operation of a display body of another embodiment.

FIGS. 35A and 35B are diagrams for illustrating the operation of a display body of another embodiment.

DESCRIPTION OF EXEMPLARY EMBODIMENTS

First Embodiment

A display body according to a first embodiment will now be described with reference to FIGS. 1 to 5.

The image displayed by the display body is not limited to a raster image composed of repeated pixels, which is an example of display regions, and may be a vector image composed of a collection of display regions represented by vectors. For convenience of explanation, the following description on a display body uses a pixel as an example of a display region and uses a collection of pixels for displaying an image in a single reflection direction as an example of a display pixel group. The accompanying drawings are not necessarily to same scale or aspect ratio as actual and may include enlarged views of characteristic parts of the display body in order to clearly show its features.

Figure 1:
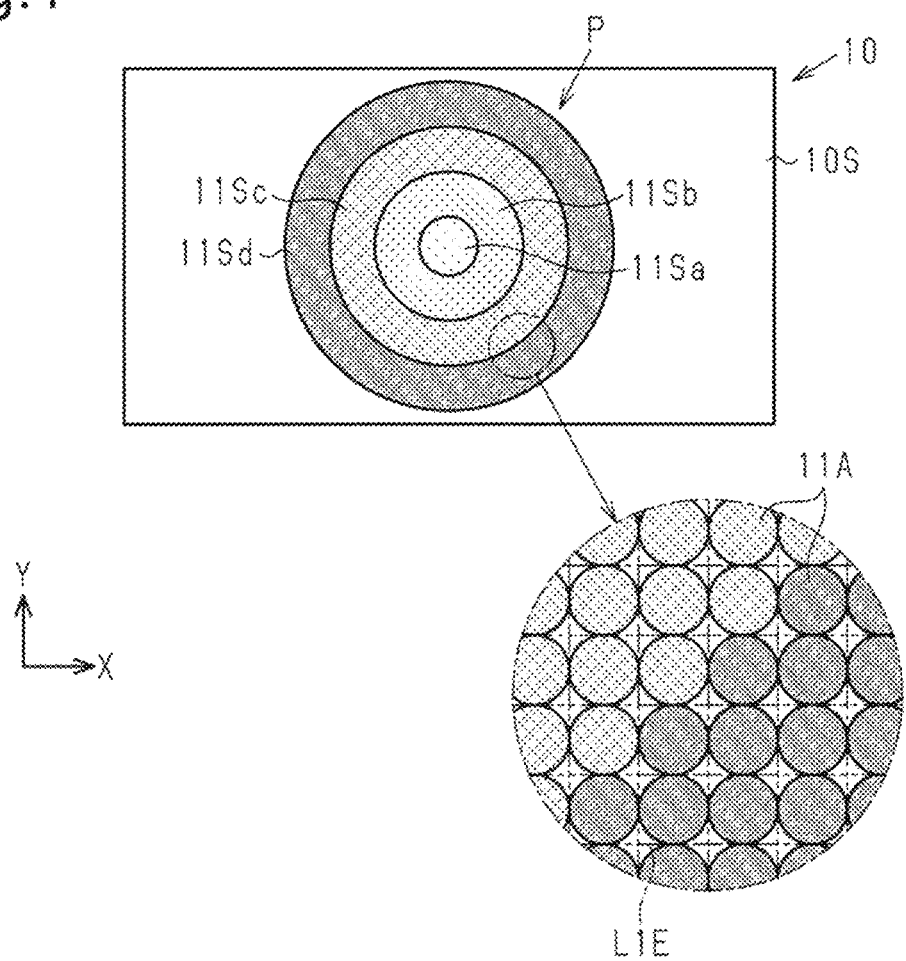
FIG. 1 is a diagram showing unit cells of a display body of a first embodiment.

As shown in FIG. 1, a display body 10 includes a display surface 10S, on which a plurality of pixels 11A is arranged. Each pixel 11A is a minimum unit in the structure for displaying an image P in the reflection direction. Pixels 11A are repeated to form an independent image. Pixels 11A are display regions, which are typically arranged in a matrix on the display surface 10S. The image P may be a character, a graphics, a symbol, or an illustration, for example. The image P of the present embodiment is circular. The display surface 10S may be flat or curved.

The display surface 10S includes a plurality of unit cells L1E, each having a predetermined size that occupies a predetermined area. The unit cells L1E may be arranged in a matrix on the display surface 10S. A unit cell L1E is a minimum unit that is repeated on the display surface 10S to provide optical effects. In the example shown in FIG. 1, the pixels 11A are arranged in the unidirectional X direction, and in the unidirectional Y direction which is perpendicular to the X direction. Each unit cell L1E of the rectangular grid includes one pixel 11A.

Further, the display surface 10S of the present embodiment includes a plurality of pixel groups 11Sa to 11Sd, each associated with a corresponding one of different tones in the image to be displayed. In the example shown in FIG. 1, a circular first pixel group 11Sa is located at the center of the image P. An annular second pixel group 11Sb is located next to and radially outward of the first pixel group 11Sa. An annular third pixel group 11Sc is located next to and radially outward of the second pixel group 11Sb. An annular fourth pixel group 11Sd is located next to and radially outward of the third pixel group 11Sc. The pixel groups 11Sa to 11Sd each includes a plurality of unit cells L1E. In each of the pixel groups 11Sa to 11Sd, the unit cells L1E include the identical pixels 11A.

Figure 2:
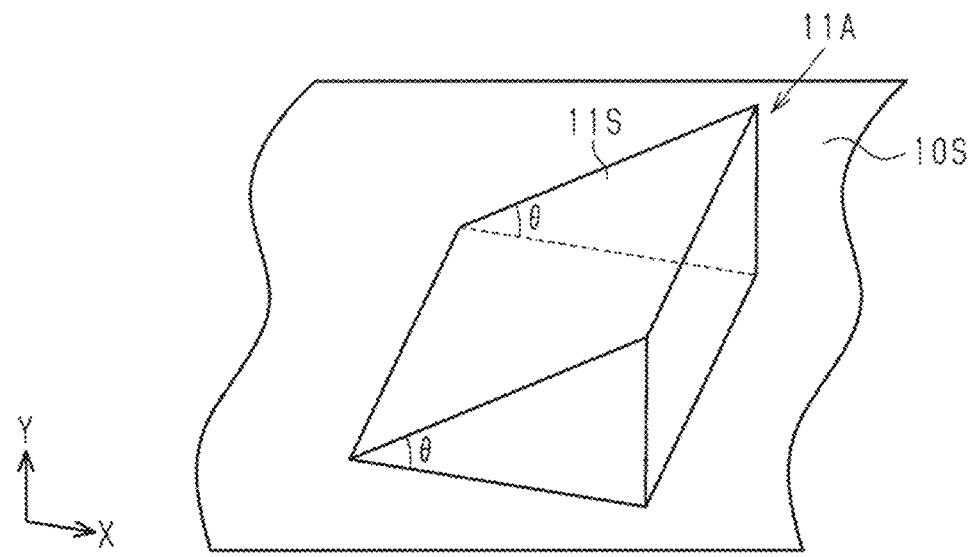
FIG. 2 is a perspective view showing a pixel of the first embodiment.

As shown in FIG. 2, a pixel 11A includes a reflection surface 11S which reflects the light incident on the display surface 10S toward an area including the reflection direction associated with the each of the pixel groups 11Sa to 11Sd. The reflection surface 11S is an optical surface intersecting with the display surface 10S. The reflection surface 11S and the display surface 10S form an inclination angle θ, which is uniform along the Y direction. Each reflection surface 11S is shaped so as to reflect the light that is incident on the reflection surface 11S at an incident angle in a given range. Each reflection surface 11S is also shaped such that its reflection angle corresponds to the reflection direction that is common to the pixel group. The reflection surface 11S is a specular surface, which specularly reflects visible light. The light that is incident on the reflection surface 11S from a given direction is regularly reflected in a direction corresponding to the inclination angle θ of the reflection surface 11S. Each of the pixel groups 11Sa to 11Sd forms an image unique to the pixel group in the reflection direction associated with the pixel group through reflection at the reflection surfaces 11S of the pixel group.

In two adjacent reflection directions among the plurality of reflection directions, different images are formed that have a interrelation between each other. Two adjacent reflection directions are reflection directions that have the minimum difference between each other among the various reflection directions unique to the respective display region groups. Images that have an interrelation include the same type of element images, but these element images differ from each other in shape. The shapes of the element images vary along the sequence of reflection directions with regularity. In other words, the shapes vary continuously. In the example shown in FIG. 1, the optical effects of the pixels 11A forming the pixel groups 11Sa to 11Sd display a dynamic image P, which expands radially outward from the radial center of the image P in a continuous manner as the reflection direction of the display body 10 varies. In the image P, the element images have annular shapes, which are geometrical patterns.

Each pixel 11A preferably has a structure width of 1 μm to 300 μm. A structure width of 1 μm or more limits generation of diffracted light, which produces iridescent color in the image. A structure width of 300 μm or less reduces the likelihood that the observer perceives the inclined structure of the reflection surface 11S of each pixel 11A and limits decrease in the resolution of the image P displayed by the display body 10. The structure width is the width of the pixel 11A in the direction in which a plurality of pixels 11A is arranged in each of the pixel groups 11Sa to 11Sd.

The pixels 11A may be made of any material. Examples of the material of the pixels 11A include a polymer composition. In addition to a polymer composition, the material of the pixels 11A may contain materials such as a curing agent, a plasticizer, a dispersant, various leveling agents, an ultraviolet absorber, an antioxidant, a viscosity modifier, a lubricant, and a photostabilizer. Each pixel 11A may be a projection forming a triangular prism on the display surface 10S, or may be a depression having a reflection surface 11S in the display surface 10S.

The configuration of the reflection surface 11S of each pixel 11A is now described in detail. The traveling direction of the light reflected by the reflection surface 11S may be the direction in which light is diffracted by the reflection surface 11S or may be different from the direction of light diffracted by the reflection surface 11S.

As shown in FIGS. 3A to 3D, pixels 11A are set at different rotational positions about the axis perpendicular to the display surface 10S, so that the reflection surfaces 11S have mutually different orientations. With respect to the pixel 11A shown in FIG. 3A, the pixels 11A of FIGS. 3B to 3D are arranged in ascending order of difference in rotation angles.

FIGS. 4A to 4D are cross-sectional views of the pixels 11A of FIGS. 3A to 3D in the X direction. That is, FIG. 4A shows the cross-sectional view of the pixel 11A of FIG. 3A, FIG. 4B shows the cross-sectional view of the pixel 11A of FIG. 3B, FIG. 4C shows the cross-sectional view of the pixel 11A of FIG. 3C, and FIG. 4D shows the cross-sectional structure of the pixel 11A of FIG. 3D. As shown in FIG. 4A, the inclination angle formed by the reflection surface 11S and the display surface 10S of the reference pixel 11A is θ1. As shown in FIG. 4B, the inclination angle formed by the reflection surface 11S and the display surface 10S of the pixel 11A that differs from the reference pixel 11A in rotation angle is θ2.

As shown in FIGS. 4A and 4B, when the orientation of the reflection surface 11S of a pixel 11A is aligned with the X direction, the length of the oblique side of the reflection surface 11S of this pixel 11A is a distance L1. In contrast, when the orientation of the reflection surface 11S of a pixel 11A is aligned with a direction that intersects with the X direction, the length of the oblique side of the reflection surface 11S of this pixel 11A is a distance L2, which is longer than distance L1. The reflection surfaces 11S of pixels 11A have the equal height H, regardless of the orientations of the reflection surfaces 11S of the pixels 11A. Thus, as shown in FIG. 4B, the inclination angle θ2 formed by the reflection surface 11S of the pixel 11A that differs from the reference pixel 11A in rotation angle is smaller than the inclination angle θ1 of the reflection surface 11S of the reference pixel 11A shown in FIG. 4A.

Further, as shown in FIG. 4C, when the reflection surface 11S of a pixel 11A differs more greatly in orientation from the reference pixel 11A than the pixel 11A shown in FIG. 4B, the length of the oblique side of the reflection surface 11S of this pixel 11A is a distance L3, which is longer than the distance L2. The reflection surfaces 11S of pixels 11A have the equal height H, regardless of the orientations of the reflection surfaces 11S of the pixels 11A. Thus, as shown in FIG. 4C, the inclination angle 63 formed by the reflection surface 11S of the pixel 11A that has a greater difference in rotation angle from the reference pixel 11A is smaller than the inclination angle θ2 of the reflection surface 11S of the pixel 11A in FIG. 4B, which have a smaller difference in rotation angle from the reference pixel 11A.

Further, as shown in FIG. 4D, when the reflection surface 11S of a pixel 11A differs more greatly in orientation from the reference pixel 11A than the pixel 11A shown in FIG. 4C, the length of the oblique side of the reflection surface 11S of this pixel 11A is a distance L4, which is longer than the distance L3. The reflection surfaces 11S of pixels 11A have the equal height H, regardless of the orientations of the reflection surfaces 11S of the pixels 11A. Thus, as shown in 4D, the inclination angle θ4 formed by the reflection surface 11S of the pixel 11A that have a greater difference in rotation angle from the reference pixel 11A is smaller than the inclination angle θ3 of the reflection surface 11S of the pixel 11A shown in FIG. 4C, which have a smaller difference in rotation angle from the reference pixel 11A.

That is, there is a certain interrelation between the orientation of the reflection surface 11S of a pixel 11A and the inclination angle θ (θ1 to θ4) of the reflection surface 11S of the pixel 11A in a cross section perpendicular to the display surface 10S. Different orientations of the reflection surfaces 11S of pixels 11A result in different inclination angles θ (θ1 to θ4) of the reflection surfaces 11S of the pixels 11A in the cross sections. The reflection surface 11S of each pixel 11A may be a flat or non-flat surface having an inclination angle θ. A non-flat reflection surface 11S may be a surface including minute projections and depressions or may be a curved surface. The inclination angle θ of a non-flat reflection surface 11S may be the inclination angle of a flat reference surface that approximates the non-flat reflection surface 11S.

As shown in FIGS. 5A to 5D, the inclination angle θ (θ1 to θ4) of the reflection surface 11S of each pixel 11A may be set such that the traveling direction of the light reflected by the reflection surface 11S differs from or coincides with the direction of light diffracted by the reflection surface 11S. For example, the inclination angle θ may be sized such that the traveling direction of the light specularly reflected by the reflection surface 11S coincides with the traveling direction of m-th order diffracted light (m is an integer of 1 or more), which is produced by the reflection surface 11S and has a specific wavelength A. In this case, the m-th order diffracted light travels in the reflection direction DK.

Specifically, an incident angle α is formed by the traveling direction of the incident light on the reflection surface 11S and the direction of the normal to the display surface 10S. A diffraction angle β (β1, β2, β3 or β4) is formed by the traveling direction of the m-th order diffracted light and the direction normal to the display surface 10S. The diffracted light produced by the pixel 11A has a certain wavelength λ, and the diffraction angle β is a value unique to the inclination angle θ of the reflection surface 11S. Incident angle α, diffraction angle β, wavelength λ, and inclination angle θ satisfy Equations (1) and (2) below.

$$\sin α + \sin β = mλ \text{ (} m \text{ is an integer of 1 or more)} \quad (1)$$

$$θ = (α − β)/2 \quad (2)$$

The reflection surface 11S having the inclination angle θ described above diffracts the m-th order diffracted light of a certain wavelength A with high diffraction efficiency. For example, a reflection surface 11S converts white incident light into colored light in the reflection direction with high conversion efficiency. In addition, since each pixel 11A has one reflection surface 11S, the image displayed in the reflection direction DK can be high resolution. As a result, the image displayed in the reflection direction DK is formed by the light diffracted with high diffraction efficiency and therefore has increased visibility.

When light beams are incident from a given direction and at the same incident angle α onto reflection surfaces 11S of pixels 11A having different inclination angles θ, the light beams are diffracted in different reflection directions DK.

Specifically, the diffraction angle β is obtained using Equation (2) based on the inclination angle θ of the reflection surface 11S of the pixel 11A and the incident angle α.

$$β = α − 2θ \quad (3)$$

As is apparent from Equation (3), assuming that the incident angle α is fixed, when the reflection surface 11S of a pixel 11A has the inclination angle θ1, which is a relatively large angle, the diffraction angle β is relatively small. Accordingly, as shown in FIGS. 5A and 5B, the diffraction angle β2 that results when the reflection surface 11S of a pixel 11A has the inclination angle θ2, which is a relatively small angle, is larger than the diffraction angle β1 that results when the inclination angle θ of the reflection surface 11S of a pixel 11A is θ1, which is a relatively large angle.

Figure 5A:
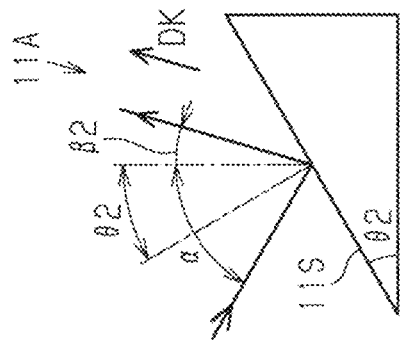
FIGS. 5A to 5D are diagrams for illustrating the operations of the pixels shown in FIGS. 3A to 3D.
Figure 5B:
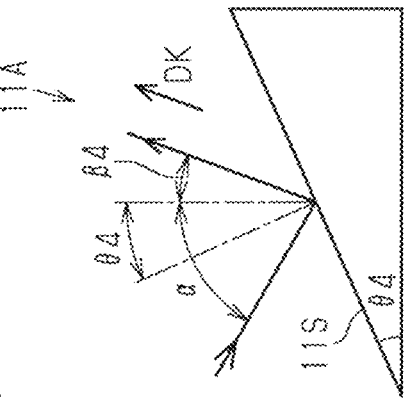
Figure 5C:
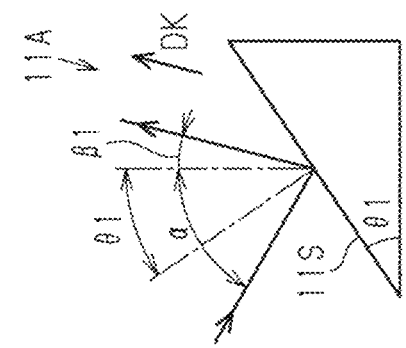
Figure 5D:
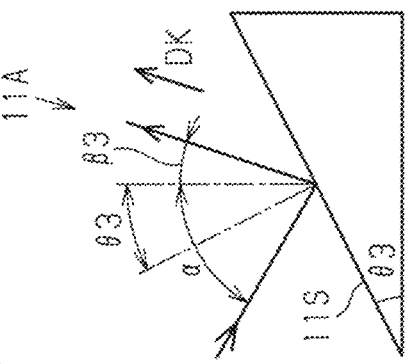

Similarly, as shown in FIGS. 5B and 5C, the diffraction angle β3 that results when the reflection surface 11S of a pixel 11A has the inclination angle θ3, which is a relatively small angle, is larger than the diffraction angle β2 that results when the inclination angle θ of the reflection surface 11S of a pixel 11A is θ2, which is a relatively large angle. Furthermore, as shown in FIGS. 5C and 5D, the diffraction angle β4 that results when the reflection surface 11S of a pixel 11A has the inclination angle θ4, which is a relatively small angle, is larger than the diffraction angle β3 that results when the inclination angle θ of the reflection surface 11S of a pixel 11A is θ3, which is a relatively large angle.

That is, there is a certain interrelation between the inclination angle θ of the reflection surface 11S of a pixel 11A and the diffraction angle β. Changing the inclination angle θ of the reflection surface 11S of a pixel 11A changes the direction in which an image is displayed by the light diffracted by the pixel 11A, in other words, the reflection direction.

In the present embodiment, the pixel 11A shown FIG. 5A is used for the first pixel group 11Sa of the pixels 11A forming the image P shown in FIG. 1. The pixel 11A shown in FIG. 5B is used for the second pixel group 11Sb. The pixel 11A shown in FIG. 5C is used for the third pixel group 11Sc. The pixel 11A shown in FIG. 5D is used for the fourth pixel group 11Sd.

When the display body 10 is observed from the direction corresponding to the diffraction angle β1, the image displayed by the pixels 11A shown in FIG. 5A, which is the image displayed by the circular pixel group 11Sa in the image P of FIG. 1, is perceived with high brightness. When the display body 10 is observed from the direction corresponding to the diffraction angle β2, the image displayed by the pixels shown in FIG. 5B, which is the image displayed by the annular pixel group 11Sb, is perceived with high brightness.

When the display body 10 is observed from the direction corresponding to the diffraction angle β3, the image displayed by the pixels 11A shown in FIG. 5C, which is the image displayed by the annular pixel group 11Sc, is perceived with high brightness. When the display body 10 is observed from the direction corresponding to the diffraction angle β4, the image displayed by the pixels 11A shown in FIG. 5D, which is the image displayed by the annular pixel group 11Sd, is perceived with high brightness.

That is, as the reflection direction of the display body 10 is continuously varied from the direction corresponding to the diffraction angle β1 toward the direction corresponding to the diffraction angle β4, the image P shown in FIG. 1 is perceived as a dynamic image that continuously expands radially outward from the radial center of the image P.

The combination of the pixels 11A corresponding to the diffraction angle β1 and the pixels 11A corresponding to the diffraction angle β2 is a combination of sets of pixels 11A for displaying images in adjacent directions, in other words, a combination of sets of pixels 11A associated with adjacent reflection directions. These sets of pixels 11A are adjacent to each other on the display surface 10S. As for the combination of the pixels 11A corresponding to the diffraction angle β2 and the pixels 11A corresponding to the diffraction angle β3, these sets of pixels 11A are adjacent to each other on the display surface 10S. As for the combination of the pixels 11A corresponding to the diffraction angle β3 and the pixels 11A corresponding to the diffraction angle β4, these sets of pixels 11A are adjacent to each other on the display surface 10S. That is, when two adjacent reflection directions among a plurality of reflection directions are referred to as a first reflection direction and a second reflection direction, the pixels 11A forming the pixel group that displays an image in the first reflection direction are adjacent to the pixels 11A forming the pixel group that displays an image in the second reflection direction.

This structure provides the visual effect that defines the direction of the sequence of movements in the image P. Accordingly, when the direction in which the display body 10 is observed is continuously varied, the image P moves radially outward from its radial center along the adjacent regions in the image P.

This visual effect of defining the direction of sequence of image movements is achieved by the inclination angles θ of the reflection surfaces 11S, which have a certain interrelation among the pixels 11A and vary sequentially with predetermined regularity. This visual effect of defining the direction of sequence of image movements is also achievable by a configuration in which the traveling direction of the light reflected by the reflection surface 11S differs from the direction of light diffracted by the reflection surface 11S.

Examples of a method for manufacturing the display body 10 include duplicating the display body 10 from an original plate. To manufacture the original plate, a photosensitive resin is applied to one surface of a planar substrate and then irradiated with a beam, so that a part of the photosensitive resin is exposed and developed. Then, a metal stamper is produced from the original plate by electroplating, for example, and the display body 10 is duplicated using this metal stamper as the matrix. The metal stamper may be manufactured by cutting a metal substrate using lathe technique. The display body 10 may be duplicated by forming a shaped product using a technique such as a heat embossing method, a casting method, or a photopolymer method, and by vapor-depositing a reflection layer on the surface of the shaped product.

The photopolymer method introduces a radiation-curing resin into the gap between a flat substrate, such as a plastic film, and the metal stamper, cures the radiation-curing resin by radiation, and removes the cured resin layer from the metal stamper together with the substrate. The photopolymer method produces pixels 11A with high structural accuracy, heat resistance, and chemical resistance and is thus more desirable than a pressing method and a casting method, which use a thermosetting resin.

The reflection layer may be made of any material that has reflectivity and can form a reflection layer through vapor deposition. The reflection film may be made of a metal or an alloy. The reflection film may be made of a metal, such as aluminum, gold, silver, platinum, nickel, tin, chromium, or zirconium, or alloys thereof. The reflection layer may include a layer made of a highly refractive material, such as zinc oxide and zinc sulfide. Aluminum and silver are preferable over other materials since they have particularly high reflectivities for the visible light region.

The method for forming the reflection layer is not limited to the vapor deposition, and any method may be used that can form a reflection layer on the reflection surface 11S of the pixel 11A. The reflection layer may be formed by a physical vapor deposition method (PVD method) or a chemical vapor deposition method (CVD method). The physical vapor deposition method (PVD method) may be (a) a vacuum deposition method, a sputtering method, an ion plating method, or an ion cluster beam method. The chemical vapor deposition method (CVD method) may be (b) a plasma chemical vapor deposition method, a thermal chemical vapor deposition method, or a photochemical vapor deposition method. However, of these methods, the vacuum evaporation method and the ion plating method are preferable over the others. These methods have higher productivity and produce desirable reflection layers.

As described above, the first embodiment has the following advantages.

(1) When the direction in which the display body 10 is observed is shifted, images that have interrelated but different contents are displayed in turn in different observation directions. This increases the aesthetic appearance of the display body 10.

(2) While the direction in which the display body 10 is observed is shifted, the variations in the image P are perceived in a wide viewing zone. This allows for easier, quick authentication of the display body 10 based on the image P.

(3) Images having an interrelation include the same type of element images, but differ in shape of the element images. The interrelation between the images is thus easily recognized by the observer when the observation direction is changed. This enhances the effect of displaying images that have interrelated but different contents according to the reflection direction.

(4) When the direction in which the display body 10 is observed is shifted continuously, the image P continuously varies in content. This further increases the aesthetic appearance of the display body 10.

(5) The pixel groups 11Sa to 11Sd, which provide continuous varies of content in the image P, are adjacent to one another, such that adjacent reflection surfaces 11S may be similar in structure. This reduces the load required to manufacture the display body 10.

(6) There is a certain interrelation between the orientation of the reflection surface 11S of each pixel 11A and the direction in which the reflection surface 11S reflects light. The orientation of the reflection surface 11S of each pixel 11A may be used as a control parameter in adjusting the direction of light reflected by the pixel 11A having the reflection surface 11S. This facilitates establishing an association between an intended reflection direction and each of the pixel groups 11Sa to 11Sd, each formed by a collection of pixels 11A.

(7) The display surface 10S includes a plurality of pixels 11A, and each of the unit cells of the display surface 10S contains one pixel 11A. As such, it is possible to design the structure of the pixels 11A in unit cells based on a raster image, which is an image formed by a collection of small color points, or dots.

(8) The reflection surface 11S of each pixel 11A is in the reflection layer covering the substrate. This can make the reflected light traveling in the reflection direction different in intensity from that of the reflected light reflected by the substrate.

The first embodiment described above may be modified as follows.

The method for dynamically displaying an image of a geometric pattern when the direction in which the display body 10 is observed is continuously varied may be modified as the modifications described below.

Figure 6A:
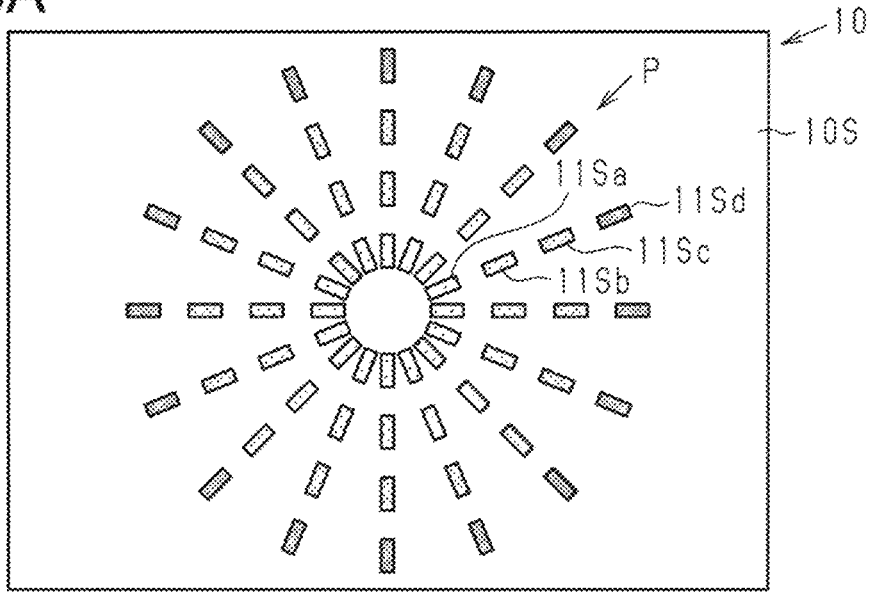
FIGS. 6A to 6C are diagrams each illustrating an example of a method for dynamically displaying an image with a display body of a modification of the first embodiment.

As shown in FIG. 6A, the configuration of the first example displays a dynamic image P that expands linearly and radially from the center of the display surface 10S in a plan view of the display surface 10S. The image P expands in accordance with varies in reflection directions of the display region groups. In this example, in a plan view of the display surface 10S, the first pixel group 11Sa, the second pixel group 11Sb, the third pixel group 11Sc, and the fourth pixel group 11Sd are arranged in this order from the center of the display surface 10S toward the outer side in the radial direction. The orientations of the reflection surfaces 11S of the pixels 11A gradually vary in the radial direction from the center of the display surface 10S, so that the image described above is displayed.

Figure 6B:
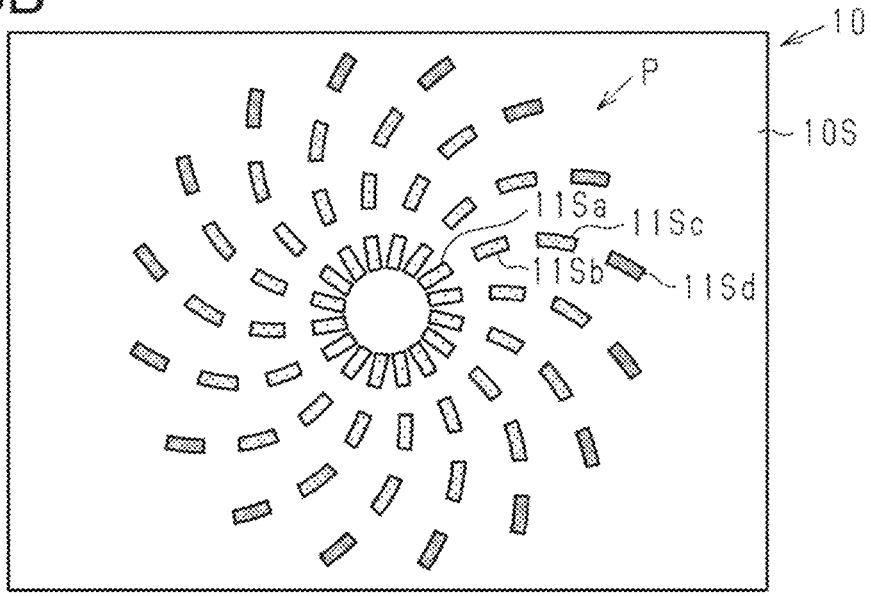

As shown in FIG. 6B, the configuration of the second example displays a dynamic image P that expands spirally and radially from the center of the display surface 10S in a plan view of the display surface 10S. The image P expands in accordance with varies in reflection directions of the display region groups. In a plan view of the display surface 10S, the first pixel group 11Sa, the second pixel group 11Sb, the third pixel group 11Sc, and the fourth pixel group 11Sd are arranged in this order from the center of the display surface 10S toward the outer side in the radial direction. The orientations of the reflection surfaces 11S of the pixels 11A gradually vary in the radial direction from the center of the display surface 10S, so that the image described above is displayed.

Figure 6C:
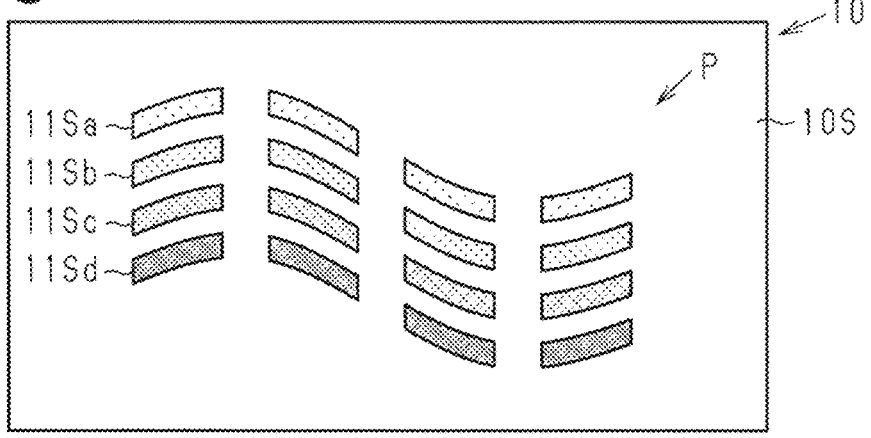

As shown in FIG. 6C, the configuration of the third example displays a dynamic image P that is wave-shaped and moves continuously from the upper side to the lower side in a plan view of the display surface 10S as viewed in the figure. The image P moves in accordance with varies in reflection directions of the display region groups. In this example, the pixel groups each extend in a wave-shaped line in the lateral direction as viewed in the figure. The pixel groups are arranged in the vertical direction, which is perpendicular to the lateral direction. The first pixel group 11Sa, the second pixel group 11Sb, the third pixel group 11Sc, and the fourth pixel group 11Sd are arranged in this order from the upper side to the lower side of the display surface 10S as viewed in the figure. The orientations of the reflection surfaces 11S of the pixels 11A vary gradually in the direction from the upper side to the lower side of the display surface 10S as viewed in the figure, so that the image described above is displayed.

In the examples described above referring to FIGS. 3A to 3D, for convenience of description, the orientations of the reflection surfaces 11S of the pixels 11A vary such that their angles are within the range that allows the reflection surfaces 11S of the pixels 11A to have the same height H in cross sections perpendicular to the display surface 10S. However, as long as the inclination angles θ of the reflection surfaces 11 vary with the orientations of the reflection surfaces 11S, the orientations of the reflection surfaces 11S may be adjusted using a range of angles that causes variation in the heights H of the reflection surfaces 11S of the pixels 11A in cross sections perpendicular to the display surface 10S. That is, any range of angles may be used provided that there is a certain interrelation between the orientation of the reflection surfaces 11S of a pixel 11A and the inclination angle θ of the reflection surface 11S of the pixel 11A in a cross section perpendicular to the display surfaces 10S, and that varying the orientation of the reflection surface 11S of a pixel 11A varies the inclination angle θ of the reflection surface 11S of the pixel 11A in the cross section. The visual effect of defining the direction of sequence of image movements can also be achieved by a configuration that includes multiple display region groups that are identical in orientation of the reflection surfaces 11S, as long as these display region groups have mutually different inclination angles θ.

The orientation of the reflection surface 11S of each pixel 11A may be defined as follows. In the following description, the direction perpendicular to the XY plane is the Z direction.

Figure 7:
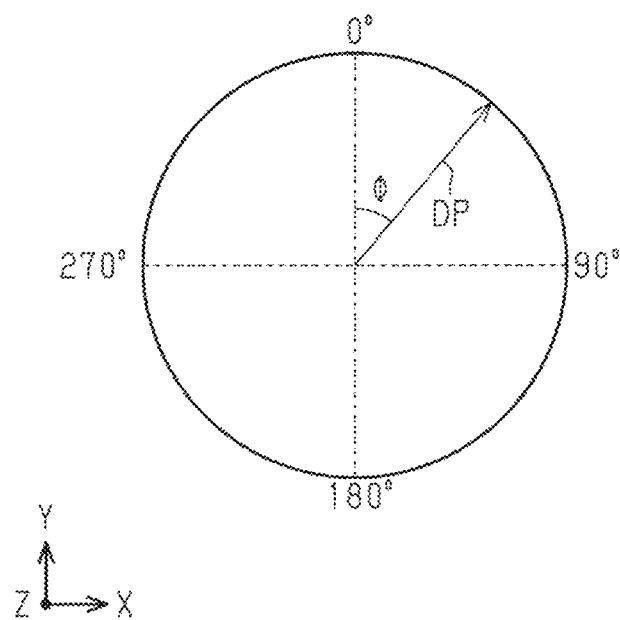
FIG. 7 is a diagram for illustrating the azimuth angle of a display body of a modification of the first embodiment.

As shown in FIG. 7, an azimuth angle Φ is formed between a projection direction DP, which is the projection normal to the reflection surface 11S onto the display surface 10S, and one direction along the display surface 10S, for example the Y direction. When the projection direction DP coincides with the Y direction, the azimuth angle Φ of the reflection surface 11S is 0°. The orientation of the reflection surface 11S can be identified from the azimuth angle Φ. The range of the azimuth angle Φ is expressed by Expression (4).

$$0° \leq \Phi < 360° \qquad (4)$$

The pixel 11A does not have to be a projection forming a triangular prism on the display surface 10S. The pixel 11A may be a projection with the following shapes. In FIGS. 8A to 8D, for the sake of convenience of illustrating the variation in height of a pixel 11A using a plane, the heights are expressed as gradations of lightness such that a position in the pixel 11A that has a greater height in the Z direction has a lower lightness.

Figure 8A:
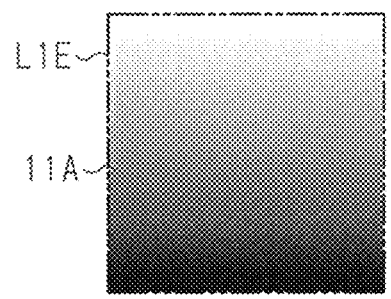
FIGS. 8A to 8D are diagrams each showing an example of a reflection surface of a display body of a modification of the first embodiment.
Figure 8B:
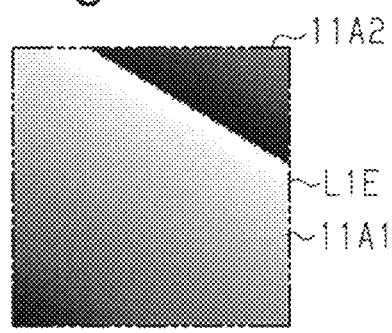
Figure 8C:
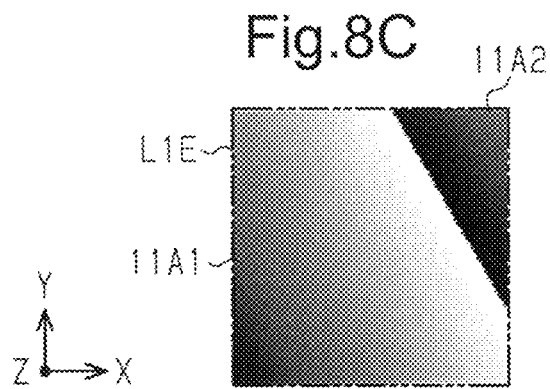
Figure 8D:
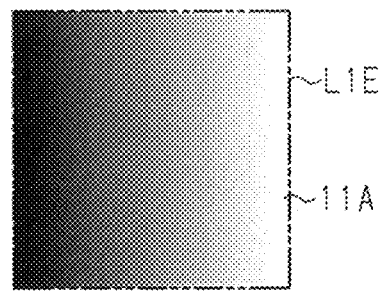

That is, when the azimuth angle Φ is 0° as shown in FIG. 8A or 90° as shown in FIG. 8D, one pixel 11A may occupy the entire unit cell L1E.

In contrast, when the azimuth angle Φ is 30° as shown in FIG. 8B or 60° as shown in FIG. 8C and the area that is occupied by reflection sections in a unit cell L1E as viewed in the Z direction is maximized, one pixel 11A may include a plurality of reflection sections. That is, a unit cell L1E may include a first reflection section 11A1 and a second reflection section 11A2, which occupies the area that is free of the first reflection section 11A1. The second reflection section 11A2 has a reflection surface 11S, which has the same azimuth angle Φ and the same inclination angle θ as the first reflection section 11A1. In other words, one unit cell L1E may contain two reflection sections.

In addition to when the first and second reflection sections 11A1 and 11A2 have an azimuth angle Φ of 30° or 60°, the unit cell L1E may contain two reflection sections when the first and second reflection sections 11A1 and 11A2 have an azimuth angle Φ of other than 0°, 90°, 180°, and 270°.

As described with reference to FIGS. 8B and 8C, one unit cell L1E may contain two or more reflection sections. For example, as described below referring to FIGS. 9A to 10C, one unit cell L1E may contain three reflection sections. That is, in one unit cell L1E, one pixel may include a plurality of reflection sections.

Figure 9A:
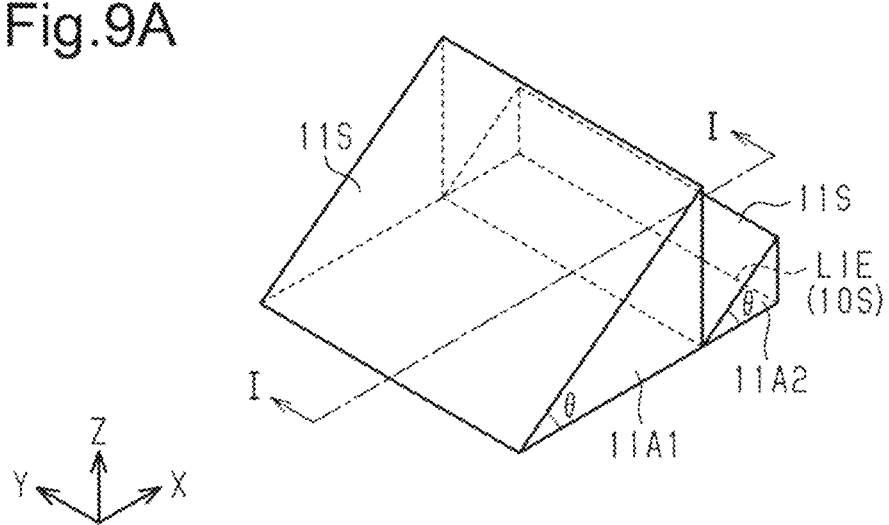
FIGS. 9A to 9C are perspective views each showing the structure of a pixel having a plurality of reflection sections in the display body.
Figure 9B:
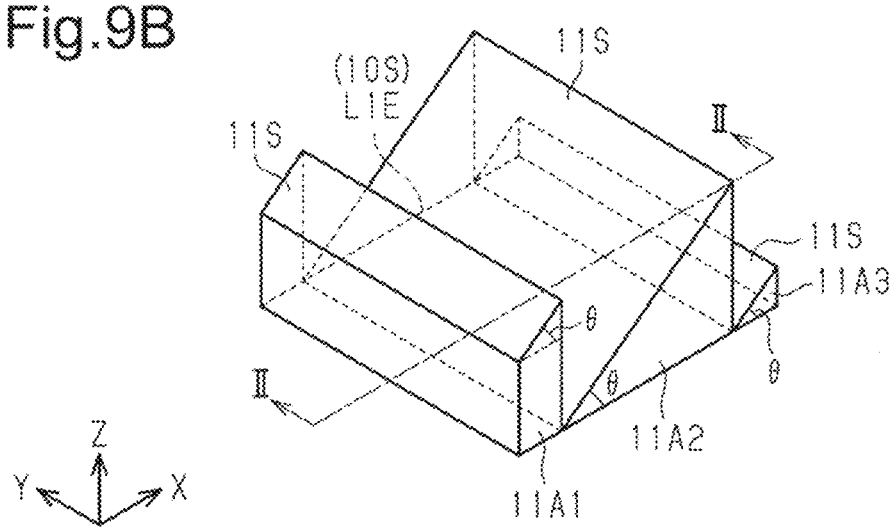
Figure 9C:
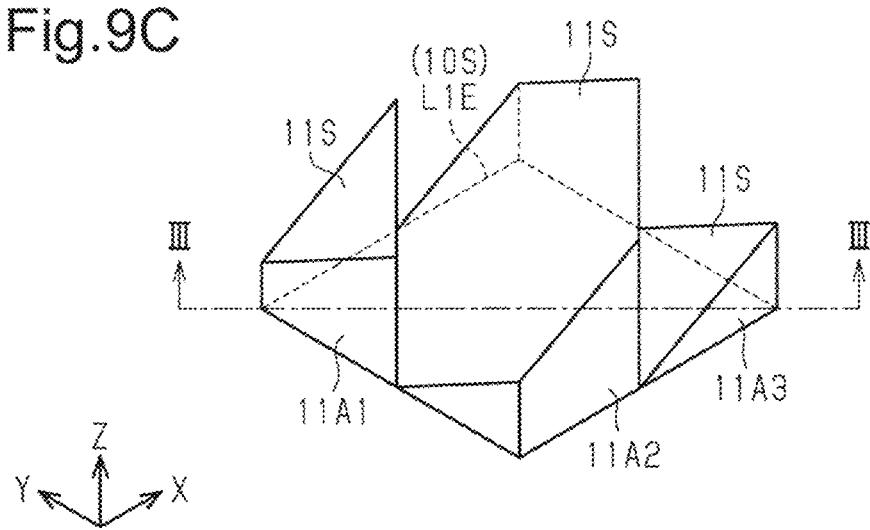
Figure 10A:
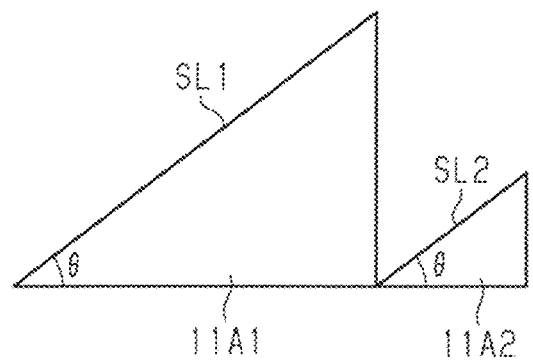
FIG. 10A is a cross-sectional view showing the cross-sectional structure taken along line I-I in FIG. 9A.
Figure 10B:
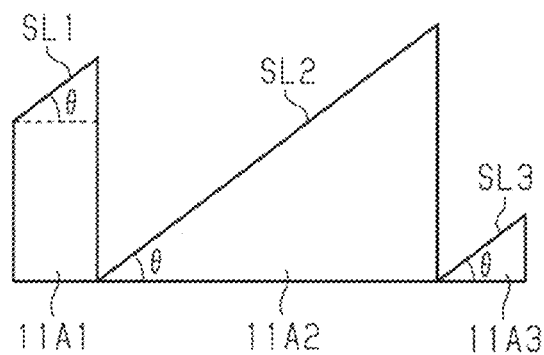
FIG. 10B is a cross-sectional view showing the cross-sectional structure taken along line II-II in FIG. 9B.
Figure 10C:
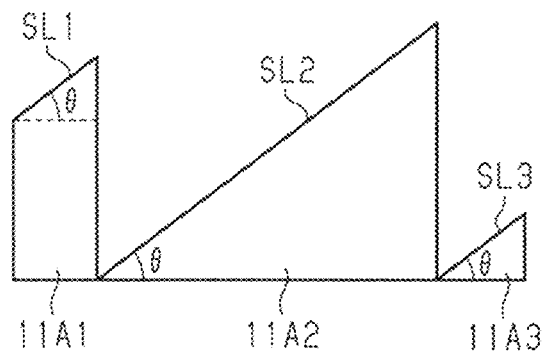
FIG. 10C is a cross-sectional view showing the cross-sectional structure taken along line III-III in FIG. 9C.

FIGS. 9A to 9C each show the structure of a pixel including two or more reflection sections in one unit cell L1E. FIGS. 10A to 10C show cross-sectional structures of the reflection sections shown in FIGS. 9A to 9C. Specifically, FIG. 10A shows the cross-sectional structure of the reflection sections of FIG. 9A, FIG. 10B shows the cross-sectional structure of the reflection sections of FIG. 9B, and FIG. 10C shows the cross-sectional structure of the reflection sections of FIG. 9C. The following descriptions on reflection sections in one unit cell L1E are given referring to the perspective views of FIGS. 9A to 9C and the cross-sectional views of FIGS. 10A to 10C simultaneously for convenience of description.

As shown in FIG. 9A, a unit cell L1E contains a first reflection section 11A1 and a second reflection section 11A2. The inclination angle θ formed by the reflection surface 11S of the first reflection section 11A1 and the display surface 10S is equal to the inclination angle θ formed by the reflection surface 11S of the second reflection section 11A2 and the display surface 10S, but the second reflection section 11A2 has a smaller height than first reflection section 11A1.

FIG. 10A shows the cross-sectional structure in an XZ plane that is taken along line I-I in FIG. 9A. In this cross section in the XZ plane, the first reflection section 11A1 has a first oblique side SL1, and the second reflection section 11A2 has a second oblique side SL2. The first oblique side SL1 is longer than the second oblique side SL2 and may be double the length of the second oblique side SL2. The width of each reflection section in the X direction, or the arrangement direction of the reflection sections, is a structure width, which is preferably within the range described above.

FIG. 9B shows a unit cell L1E that contains a first reflection section 11A1, a second reflection section 11A2, and a third reflection section 11A3. The inclination angle θ formed by the reflection surface 11S of the first reflection section 11A1 and the display surface 10S, the inclination angle θ formed by the reflection surface 11S of the second reflection section 11A2 and the display surface 10S, and the inclination angle θ formed by the reflection surface 11S of the third reflection section 11A3 and the display surface 10S are all identical. Of the three reflection sections, the first reflection section 11A1 is substantially equal to the second reflection section 11A2 in height. The height of the third reflection section 11A3 is less than the heights of the first reflection section 11A1 and the second reflection section 11A2. The second reflection section 11A2 and the third reflection section 11A3 are each shaped as a triangular prism. The first reflection section 11A1 has a shape in which a triangular prism is connected to the upper side of a rectangular prism as viewed in the figure. In other words, the first reflection section 11A1 includes a first section that is shaped as a rectangular prism and a second section that is shaped as a triangular prism. The second section is located on top of the first section.

FIG. 10B shows the cross-sectional structure in an XZ plane that is taken along line II-II in FIG. 9B. In this cross section in the XZ plane, the first reflection section 11A1 has a first oblique side SL1, the second reflection section 11A2 has a second oblique side SL2, and the third reflection section 11A3 has a third oblique side SL3. Of the three reflection sections, the second reflection section 11A2 has the longest oblique side, followed by the third reflection section 11A3 and then the first reflection section 11A1. However, two of the three oblique sides may be equal in length, or all the oblique sides may be equal in length.

The three reflection sections include reflection sections having the shape of a triangular prism and a reflection section having the shape of a combination of a triangular prism and a rectangular prism. That is, the three reflection sections include reflection sections that have different outer shapes. This limits diffraction of light, which would otherwise occur when three reflection sections are arranged in the X direction, as compared with a configuration in which the three reflection sections only include reflection sections of the identical outer shapes.

FIG. 9C shows a structure in which the reflection sections of FIG. 9B are rotated by 45° about the axis in the Z direction in the clockwise direction as viewed in the figure. That is, the azimuth angle Φ of reflection sections of FIG. 9B differs from the azimuth angle Φ of the reflection sections of FIG. 9C.

FIG. 10C shows the cross-sectional structure taken along line III-III in FIG. 9C. That is, FIG. 10C shows the cross-sectional structure along a plane extending in the Z direction and the direction that intersects with the X direction at an angle of 45°. This plane includes a diagonal line of the unit cell L1E. The cross-sectional structure along line III-III shown in FIG. 10C is identical to the cross-sectional structure along line II-II shown in FIG. 10B.

In geometrical optics, the light reflected by the reflection surface 11S does not spread. However, the diffraction phenomenon occurs when all reflection surfaces 11S have oblique sides of the same length in a cross section including a plurality of reflection surfaces 11S, such as the cross sections shown in FIGS. 10A to 10C. The length of the oblique sides corresponds to the size of slit in the diffraction phenomenon. The display body according to the present disclosure uses visible light, and the observation distance, which is the distance between the display body and the observer, is sufficiently long relative to the size of slit. As such, the Fraunhofer diffraction theory holds for the pixels of the display body. Assuming that incident light on the reflection surface 11S has a certain wavelength λ, the intensity I of the diffracted light satisfies Equation (A) below according to the slit size D, the wave number k, and the spreading angle ψ. I(0) represents the intensity of regularly reflected light.

$$I(\theta) = I(0)\left(\frac{\sin\beta}{\beta}\right)^2 \quad \text{Equation (A)}$$

$$\beta = \left(\frac{kD}{2}\right)\sin\theta \quad \text{Equation (B)}$$

Figure 11A:
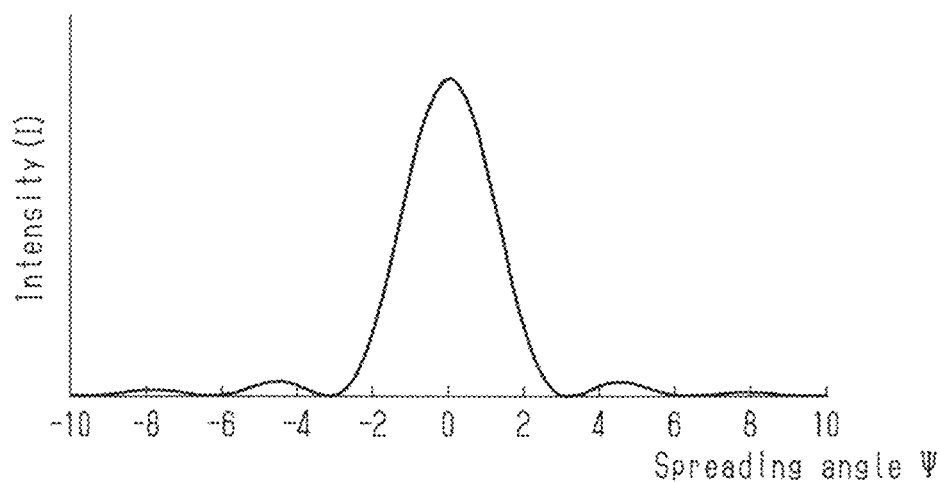
FIGS. 11A to 11C are diagrams of spectrums showing intensity distributions of diffracted light in diffraction images.
Figure 11B:
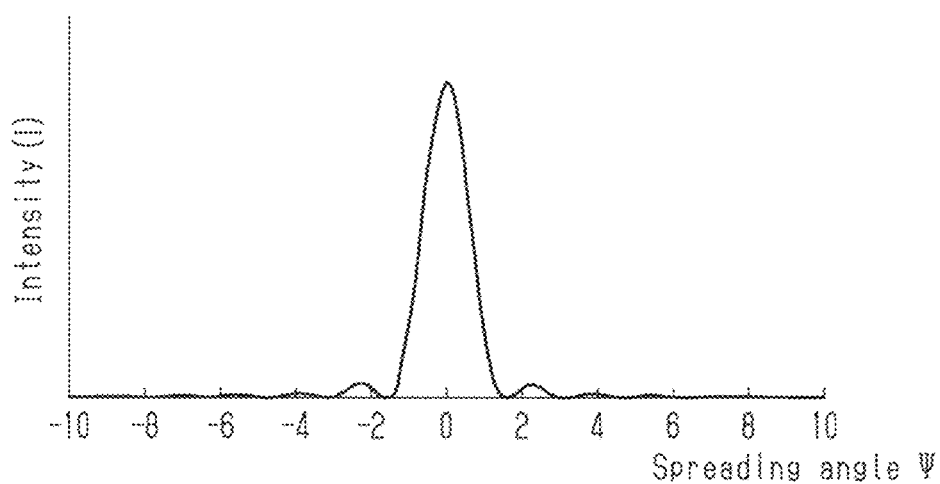
Figure 11C:
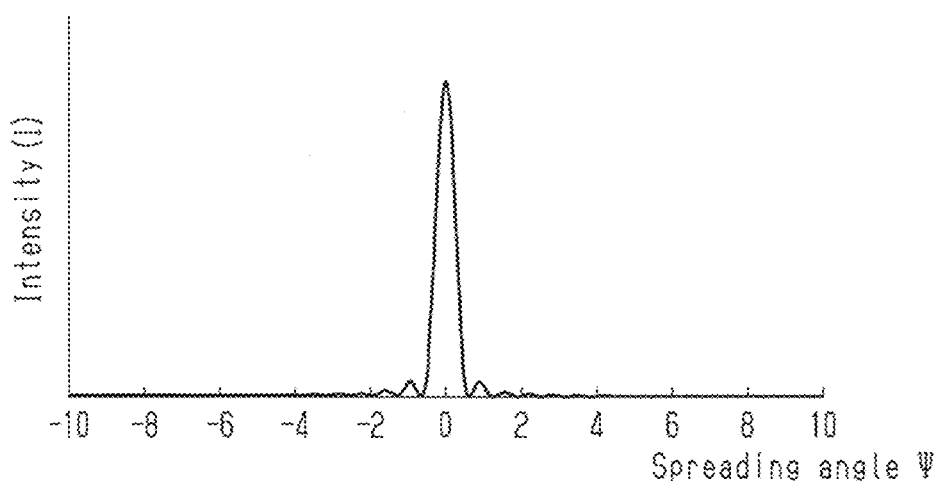

FIG. 11A shows the intensity distribution of light diffracted when the slit size D is 10 μm, FIG. 11B shows the intensity distribution of light diffracted when the slit size D is 20 μm, and FIG. 11C shows the intensity distribution of light diffracted when the slit size D is 50 μm. The intensity distributions shown in FIGS. 11A to 11C are obtained assuming that the wavelength λ of incident light is 555 nm, which has the highest relative luminosity in the wavelength range of visible light. For the sake of simplicity, it is assumed that the oblique sides of the reflection surfaces 11S are not inclined.

As is evident from FIGS. 11A to 11C, different slit sizes D, or lengths of the oblique sides of the reflection surfaces 11S, result in different states of diffraction of light reflected at the reflection surfaces 11S and thus different intensity distributions of diffracted light. In all of the intensity distributions of diffracted light, the intensity of light emerged in the direction of regular reflection of the reflection surface 11S is the highest regardless of the slit size D. The angular range of light emerged in the direction of regular reflection is a spreading angle. The spreading angle of the light emerged in the direction of regular reflection is the largest when the slit size D is 10 μm and the smallest when the slid size D is 50 μm. That is, a larger slit size D reduces the spreading angle of the light emerged in the direction of regular reflection.

The angular range of light that can be incident on the pupils of the observer of the display body is ±0.5°. When the amount of light incident on a reflection surface 11S is 100%, the amount of light reflected by the reflection surface 11S, or the pixel, is 32% when the slit size D is 10 μm, 58% when the slit size is 20 μm, and 90% when the slit size D is 50 μm. A greater slit size D, or a longer oblique side, increases the amount of light perceived by the observer and thus increases the brightness of the display body.

The display body may have multiple types of pixels having different slit sizes D, or pixel sizes. Different pixel sizes result in different intensity distributions of diffracted light. As such, the display body of this configuration includes pixels with which the observer perceives different amounts of light. The pixel size may vary from pixel group to pixel group, which is formed of a plurality of pixels.

Figure 12:
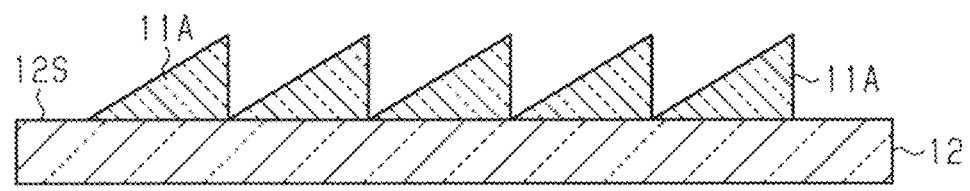
FIG. 12 is a cross-sectional view showing the cross-sectional structure of a display body of a modification of the first embodiment.

FIG. 12 shows the cross-sectional structure of a display body 10. As shown in FIG. 12, the display body 10 may include a substrate 12 and a plurality of pixels 11A described above. In this structure, the surface 12S of the substrate 12 on which the pixels 11A are located corresponds to the display surface 10S described above. The observation side of the display body 10 may be the first observation side that is opposite to the substrate 12 with respect to the pixels 11A, or the second observation side that is opposite to the pixels 11A with respect to the substrate 12. When the observation side of the display body 10 is the second observation side, the substrate 12 needs to be light transmissive.

Figure 13:
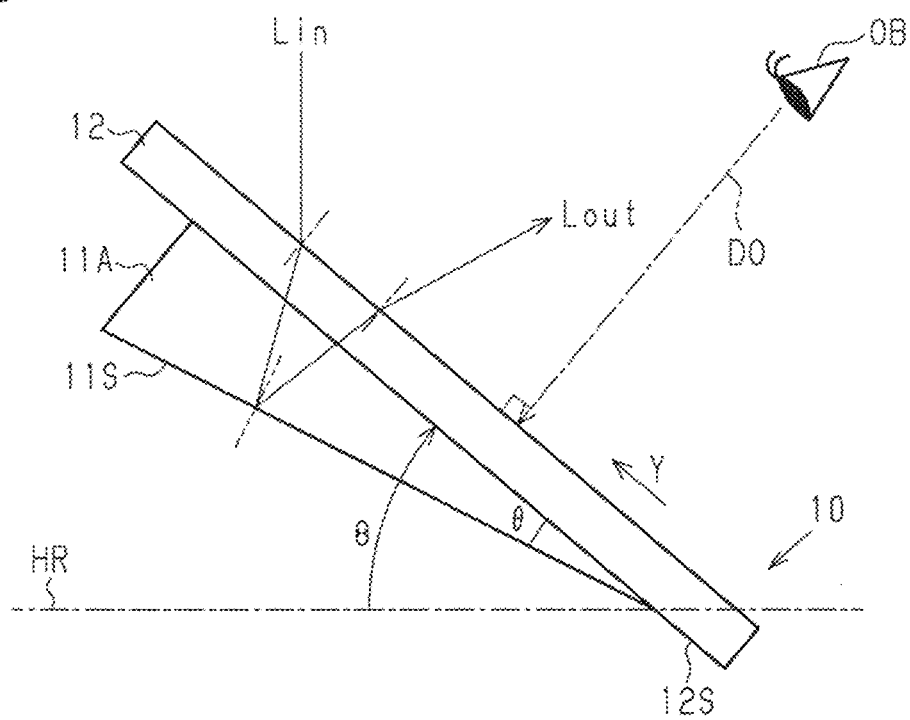
FIG. 13 is a ray diagram showing the light incident on a display body of a modification of the first embodiment and the light emerged from the display body.

FIG. 13 schematically shows the light incident on the display body 10 and the light emerged ted from the display body 10 when the observation side of the display body 10 is the second observation side. In this example, an observer OB views the display body 10 such that a plane including the observation direction DO of the observer OB is perpendicular to the XY plane extending along the display surface 10S. Further, in the example of FIG. 13, the display body 10 is set such that the substrate 12 extends in the Y direction.

As shown in FIG. 13, when observing the display body 10, the observer OB tends to tilt the display body 10 such that the inclination angle θ formed by the surface 12S of the substrate 12 and the horizontal plane HR is about 45°. In addition, light is typically incident on the display body 10 from directly above the observer OB, such as the case of sunlight and light from a fluorescent lamp located on the ceiling.

In this case, in order for the incident light Lin on the reflection surface 11S of the display body 10 to be reflected by the reflection surface 11S and emerged as outgoing light Lout toward the observation side, the azimuth angle Φ of the reflection surface 11S preferably corresponds to the direction symmetrical to the observation direction DO of the observer OB. That is, the azimuth angle Φ is preferably 0°. When the azimuth angle Φ is 0°, the observer OB perceives the reflected light with the highest intensity. The larger the difference between 0° and the azimuth angle Φ of the reflection surface 11S, the lower the intensity of light perceived by the observer OB, so that the observer OB feels that the lightness of the display body 10 is low.

The azimuth angle Φ of the reflection surfaces 11S when the display body 10 is observed from the first observation side and the azimuth angle Φ of the reflection surfaces 11S when the display body 10 is observed from the second observation side are symmetric with respect to the line passing through positions corresponding to azimuth angles Φ of 90° and 270°.

Figure 14A:
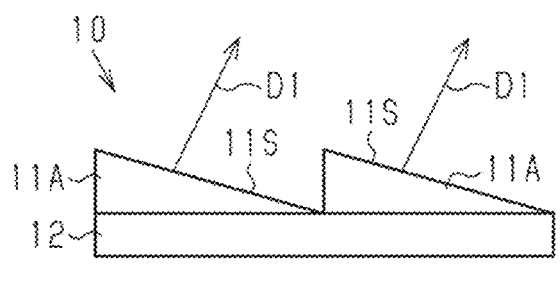
FIG. 14A is a diagram showing the normal direction in a state where a display body of a modification of the first embodiment is observed from the first observation side.
Figure 14B:
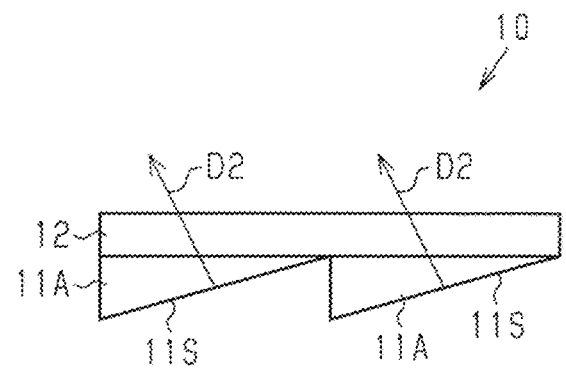
FIG. 14B is a diagram showing the normal direction in a state where the display body of the modification of the first embodiment is observed from the second observation side.

That is, as shown in FIG. 14A, when the display body 10 is observed from the first observation side, the direction of the normal to the reflection surface 11S is a first direction D1. As shown in FIG. 14B, when the display body 10 is observed from the second observation side, the direction of the normal to the reflection surface 11S is a second direction D2, which is laterally symmetrical to the first direction D1 as viewed in the figure. Thus, when the azimuth angle Φ of the display body 10 observed from the second observation side is 0°, the azimuth angle Φ of the display body 10 observed from the first observation side is 180°.

The observer OB not only observes the display body 10 while holding it inclined at a fixed angle from the horizontal plane HR but also observes the display body 10 while varying the inclination of the display body 10 from the horizontal plane HR. As described above, when the inclination angle θ between the display surface 10S and the horizontal plane HR is about 45°, an azimuth angle Φ of 0° provides the light that is perceived by the observer OB with the highest intensity.

When the display body 10 is tilted in the front-back direction, of the light reflected by the reflection surface 11S with an azimuth angle Φ of 0°, the light perceived by the observer OB decreases in intensity. In other words, when the display surface 10S is tilted such that the section of the display surface 10S that intersects with a plane including the observation direction of the observer OB and extending along the X direction and the section of the plane including the observation direction that intersects with the display surface 10S remain unchanged, of the light reflected from the reflection surface 11S having an azimuth angle Φ of 0°, the light perceived by the observer OB decreases in intensity. In contrast, of the light reflected by the reflection surface 11S with an azimuth angle Φ of 180°, the light that is perceived by the observer OB increases in intensity.

As such, the image of the display body 10 appears and disappears depending on the combination of the azimuth angle Φ of the reflection surfaces 11S and the inclination angle θ between the display surface 10S and the horizontal plane HR.

Figure 15:
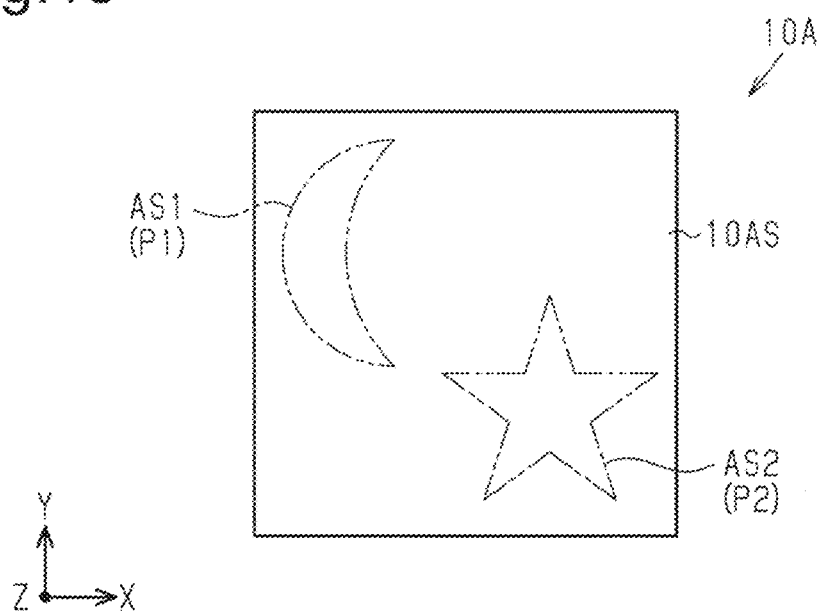
FIG. 15 is a plan view showing the planar structure of a display body of a modification of the first embodiment.
Figure 16A:
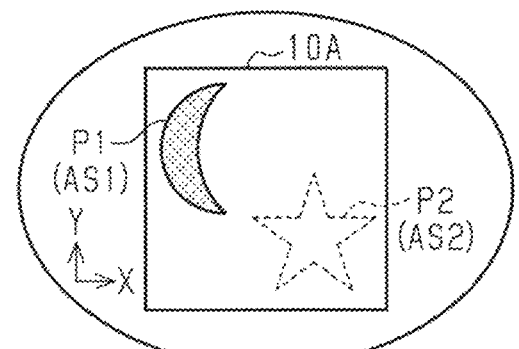
FIGS. 16A and 16B are diagrams for illustrating the operation of the display body of the modification of the first embodiment.
Figure 16B:
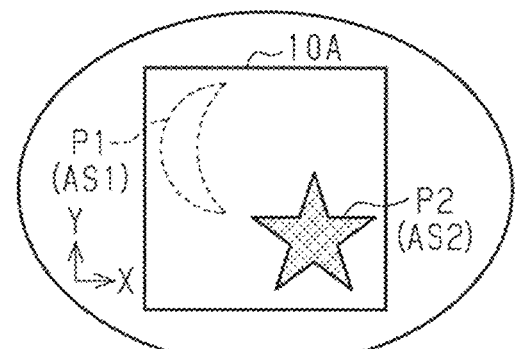

Referring to FIGS. 15 to 16B, an example is described in which the observer OB perceives an image that changes when the angle formed by the display surface 10AS of the display body 10A and the plane including the observation direction of the observer OB changes. As described above, when the Y direction in FIGS. 15 to 16B coincides with the projection direction of the reflection surface of a pixel 11A, the azimuth angle Φ of the reflection surface is 0°.

As shown in FIG. 15, the display body 10A has a display surface 10AS, which includes a first region group AS1 for displaying a first image P1 and a second region group AS2 for displaying a second image P2. The first and second region groups AS1 and AS2 each include a plurality of pixels 11A. In this example, in a plan view of the display surface 10AS, the first region group AS1 has a crescent shape, and the second region group AS2 has a star shape.

The section of the display surface 10AS other than the first and second region groups AS1 and AS2 may include pixels 11A or may be free of pixels 11A. However, when the section of the display surface 10AS other than the first and second region groups AS1 and AS2 includes pixels 11A and all the pixels 11A have the same azimuth angle Φ, the pixels 11A of a certain shape are arranged on the display surface 10AS with a fixed periodicity. This increases the likelihood that diffracted light is emerged from the display surface 10AS. The diffracted light may lower the visibility of the first and second images P1 and P2.

In contrast, when the section of the display body 10A other than the first and second region groups AS1 and AS2 is free of pixels 11A, tilting of the display body 10A causes only a small change in intensity of the light reflected from the region group that is free of pixels 11A. This maintains a constant contrast between the section that is free of pixels 11A and the first and the second images P1 and P2, thereby increasing the visibility of the images.

The range of azimuth angles Φ of the pixels 11A in the first region group AS1 is a first range, and the range of azimuth angles Φ of the pixels 11A in the second region group AS2 is a second range. The first range differs from the second range. The minimum value of the difference between the azimuth angles Φ included in the first range and the azimuth angles Φ included in the second range is preferably greater than or equal to 30°.

For example, when the azimuth angles Φ in the first range are greater than the azimuth angles Φ in the second range, the first range is greater than or equal to 90° and less than 180° and the second range is between 0° and 60° inclusive. In this case, the minimum value of the difference between the azimuth angles Φ in the first range and the azimuth angles Φ in the second range is 30°. When the difference between the azimuth angles Φ in the first range and the azimuth angles Φ in the second range is greater than or equal to 30°, the first and second images P1 and P2 are less likely to be perceived as forming a single image.

The azimuth angles Φ in the first and second ranges may be greater than or equal to 0° and less than 180°, or greater than or equal to 180° and less than 360°. For example, the first range may be greater than or equal to 120° and less than 180°, and the second range may be between 15° and 60° inclusive. The difference between the minimum azimuth angle Φ in the second range and the maximum azimuth angle Φ in the first range is preferably less than 180°.

This configuration advantageously reduces the possibility that the light emerged by the first region group AS1 and the light emerged by the second region group AS2 are perceived by the observer OB as forming a single image when the observer OB tilts the display body 10A such that the section of the display body 10A that intersects with the plane including the observation direction and extending along the X direction and the section of the plane including the observation direction that intersects with the display body 10A remain unchanged but the angle formed by the display body 10A and the plane including the observation direction is changed.

As described for the first embodiment, the plurality of pixels 11A belonging to each of the first region group AS1 and the second region group AS2 includes pixels 11A that include reflection surfaces 11S of different orientations, or azimuth angles Φ. However, the azimuth angles Φ of all reflection surfaces 11S may be identical in each region group.

Referring to FIGS. 16A and 16B, the operation of an example of a display body 10A is described in which the azimuth angles Φ in the first range are greater than or equal to 120° and less than 180° and the azimuth angles Φ in the second range are between 15° and 60° inclusive. The following operation is achieved also with a display body 10A in which the azimuth angles Φ in the first range and the azimuth angles Φ in the second range are greater than or equal to 180° and less than 360°.

As shown in FIG. 16A, the observer OB holds the display body 10A such that the display surface 10AS of the display body 10A is perpendicular to the plane including the observation direction DO of the observer OB. In addition, the observer OB holds the display body 10A such that the first region group AS1 is positioned above the second region group AS2 in the Y direction in the display surface 10AS, that is, the second region group AS2 is closer to the hand of the observer OB than the first region group AS1.

In this position, the observer OB perceives the first image P1 displayed by the first region group AS1 but cannot perceive the second image P2 displayed by the second region group AS2.

Then, as shown in FIG. 16B, the observer OB tilts the display body 10A in the front-back direction, that is, in the projection direction corresponding to an azimuth angle Φ of 0° and the projection direction corresponding to an azimuth angle Φ of 180°. In other words, the observer OB tilts the display body 10A so as to reduce one of the angles formed by the display surface 10AS and the plane including the observation direction DO and extending along the X direction, without changing the observation direction DO of the observer OB.

Specifically, the observer OB tilts the display body 10A so as to reduce, of the two angles formed on opposite sides of the plane including the observation direction DO, the angle closer to the observer OB, or the angle on the lower side of the plane including the observation direction DO in the Y direction. In other words, the observer OB tilts the display body 10A such that both of the section of the display surface 10AS of the display body 10A that intersects with the plane including the observation direction DO and the section of the plane including the observation direction DO that intersects with the display surface 10AS remain unchanged.

In this position, the observer OB perceives the second image P2 displayed by the second region group AS2 but cannot perceive the first image P1 displayed by the first region group AS1.

The display body 10A displays an image that is switched between the first image P1 and the second image P2 depending on the angle formed by the display surface 10AS of the display body 10A and the plane including the observation direction DO of the observer OB.

The azimuth angles Φ in the first range and the azimuth angles Φ in the second range may be greater than or equal to 90° and less than 180°, or greater than or equal to 180° and less than 270°. In this case, the image displayed by the display body 10A is switched between the first image P1 and the second image P2 when the observer OB tilts the display body 10A as follows.

That is, when the display body 10A is tilted in the lateral direction, or the projection direction corresponding to an azimuth angle Φ of 90° and the projection direction corresponding to an azimuth angle Φ of 270°, the image displayed by the display body 10A is switched between the first image P1 and the second image P2.

In other words, when observing the display body 10A, the observer OB tilts the display body 10A, from the position in which the display surface 10AS of the display body 10A is perpendicular to the plane including the observation direction DO of the observer OB and extending along the X direction, such that the section of the display surface 10AS of the display body 10A that intersects with the plane including the observation direction DO remains unchanged but the section of the plane including the observation direction DO that intersects with the display body 10A is changed.

As compared with the configuration described above, this configuration tends to cause multiple reflection of the light incident on the display surface 10AS when the inclination angle θ of the reflection surface 11S of each pixel 11A is relatively large. The multiple reflection may cause overlapping between the first and second images P1 and P2. As such, the reflection surface 11S of each pixel 11A preferably has an inclination angle θ that does not cause multiple reflection of the light incident on the display surface 10AS.

Figure 17:
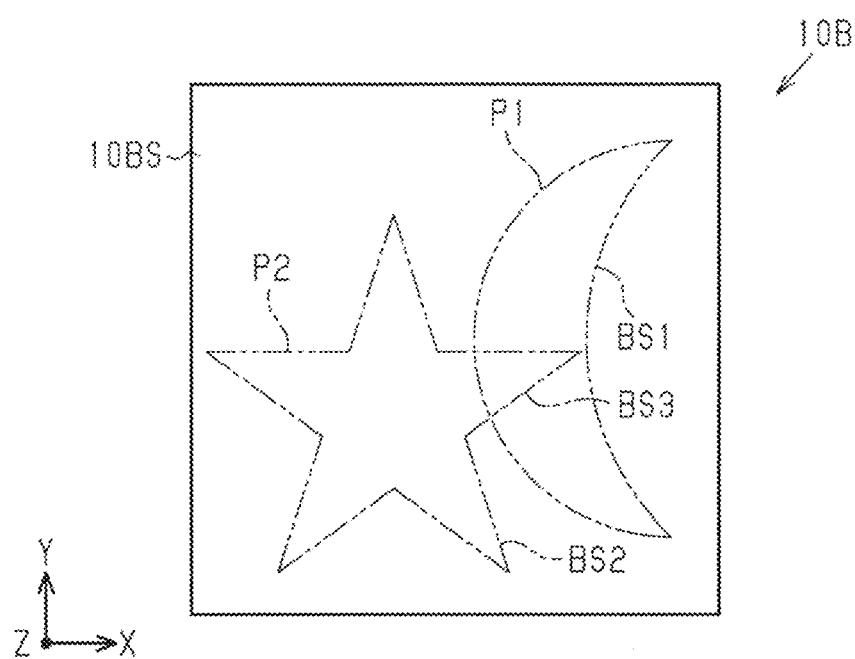
FIG. 17 is a plan view showing the planar structure of a display body of a modification of the first embodiment.

FIG. 17 shows a display body 10B that has a display surface 10BS and includes a first region group BS1, a second region group BS2, and a third region group BS3. The display body 10B displays a first image P1 and a second image P2. The first image P1 is displayed by the first and third region groups BS1 and BS3. The second image P2 is displayed by the second and third region groups BS2 and BS3. In this example, the first image P1 has a crescent shape, and the second image P2 has a star shape.

The first region group BS1 includes a plurality of unit cells L1E, each of which may contain one first pixel for displaying the first image P1. The second region group BS2 includes a plurality of unit cells L1E, each of which may contain one second pixel for displaying the second image P2. The third region group BS3 includes a plurality of unit cells L1E, some of which contain first pixels and the others contain second pixels. The section of the display surface 10BS other than the first to third region groups BS1 to BS3 may include pixels or may be free of pixels.

The first range of the azimuth angles Φ of the first pixels and the second range of the azimuth angles Φ of the second pixels preferably have a similar relationship as the first range and the second range of the display body 10A described above. Further, the section of the display surface 10BS other than the first to third region group BS1 to BS3 is preferably free of pixels because of the reason described above for the display body 10A.

In the third region group BS3, the plurality of first pixels and the plurality of second pixels may be arranged in a checkered pattern or in a stripe pattern. The third region group BS3 includes equal numbers of first pixels and second pixels. Each of the unit cells L1E in the third region group BS3 contains one of a first pixel and a second pixel.

All of the unit cells L1E in the first region group BS1 can contain first pixels, and all of the unit cells L1E in the second region group BS2 can contain second pixels. In this case, however, the section of the first image P1 displayed by the first region group BS1 differs in lightness from the section of the first image P1 displayed by the third region group BS3, and the section of the second image P2 displayed by the second region group BS2 differs in lightness from the section of the second image P2 displayed by the third region group BS3.

In this respect, the proportion of the unit cells L1E having first pixels in the first region group BS1 is preferably equal to that in the third region group BS3, and the proportion of the unit cells L1E having second pixels in the second region group BS2 is preferably equal to that in the third region group BS3.

On a display surface that displays multiple images, when one region group includes equal numbers of different types of pixels, each displaying a corresponding one of the different images, the proportion of one type of pixels displaying an image in the unit cells is preferably the reciprocal of the number of images in each of the region groups including pixels.

A display body may display four images, and one region group in the display surface of the display body may include four types of pixels that display their respective images. The four types of pixels may be arranged in one of the first, second, and third arrangements.

The first arrangement sets four types of pixels in stripes, and four lines of mutually different types of pixels form one periodicity. The second arrangement sets the pixels of different types in lines forming 45° with the X direction. In the same manner as the first arrangement, the four lines of mutually different types of pixels form one periodicity in the second arrangement. The third arrangement sets pixels of four different types about one grid point of unit cells L1E so that the four types of pixels are arranged next to one another.

When one side of a unit cell L1E corresponds to 1, the periodicity of pixels in the first arrangement corresponds to 4, the periodicity of pixels in the second arrangement corresponds to $2\sqrt{2}$, and the periodicity of pixels in the third arrangement corresponds to 2. The periodicity corresponds to the resolution of the image. A smaller periodicity of pixels is desirable to reduce the resolution of the image.

When the display body 10 is observed from the second observation side, the inclination angles θ of reflection surfaces 11S are preferably set as follows. An example of a display body 10 is described below in which the refractive index of the plurality of pixels 11A is equal to the refractive index of the substrate 12.

Figure 18:
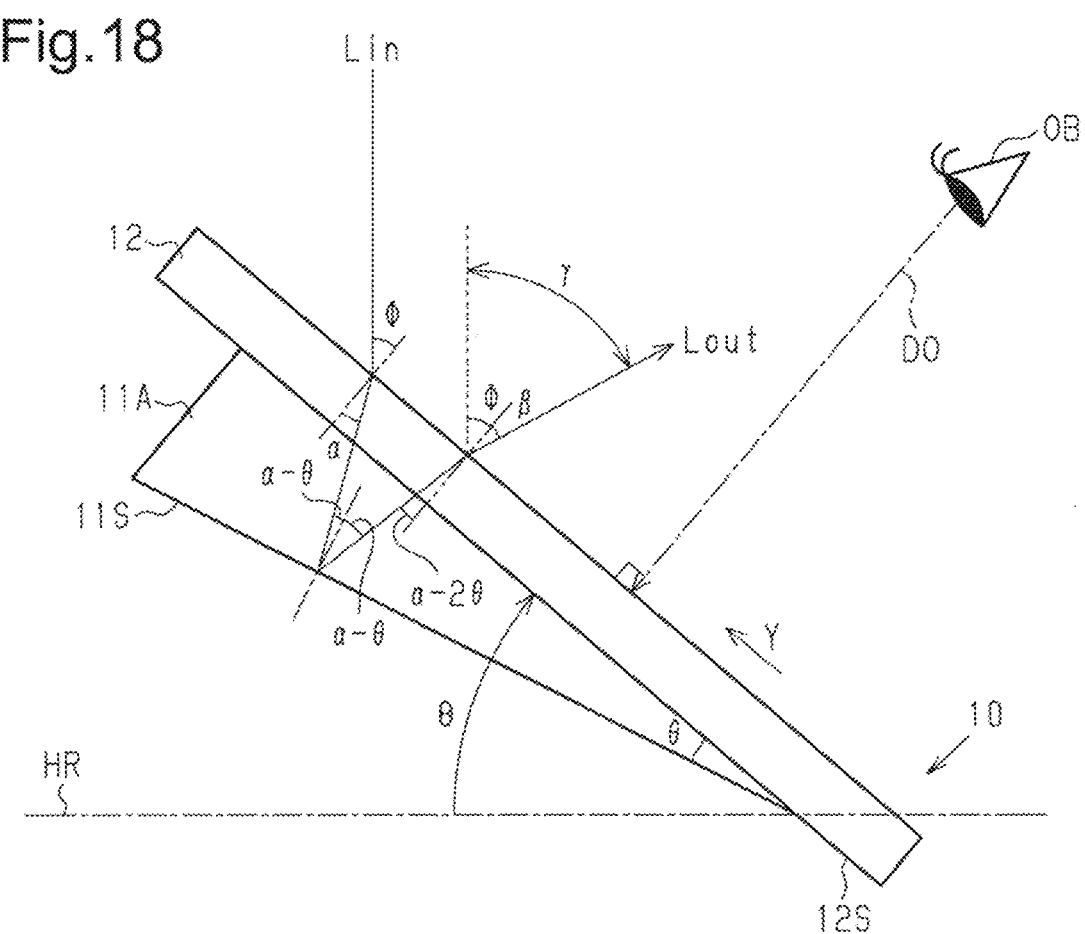
FIG. 18 is a ray diagram showing the light incident on a display body of a modification of the first embodiment and the light emerged from the display body.

As shown in FIG. 18, when light is incident from directly above the observer OB toward the display body 10, the incident light Lin is refracted at the interface between air and the substrate 12, and is reflected at the reflection surface 11S of the pixel 11A. Then, the light reflected at the reflection surface 11S is refracted at the interface between the substrate 12 and air and is perceived as outgoing light Lout by the observer OB.

Here, it is assumed that the inclination angle θ between the display surface 10S, or the surface 12S of the substrate 12, and the horizontal plane HR is 45°, and the plane including the observation direction DO of the observer OB forms a right angle with the display surface 10S. Under these conditions, the observer OB perceives light with the highest intensity when the angle γ formed by the outgoing light Lout and the incident light Lin is 45°.

To calculate the inclination angle θ of the reflection surface 11S, following Equation (5), which is Snell's law, is used.

$$n1 \sin \alpha = n2 \sin \beta \qquad (5)$$

In Equation (5), n1 and n2 are the refractive indices of the mediums, α is the refraction angle of the incident light Lin, and β is the refraction angle of the outgoing light Lout. The refraction at the interface between the display body 10 and air is described below assuming that the refractive index of pixels 11A and the refractive index n1 of the substrate 12 are 1.5. The refractive index n2 of air is 1.

As described above, the refraction at the interface between the display body 10 and air occurs on two occasions: the first occasion where the incident light Lin enters the display body 10 from air; and the second occasion where the light reflected by the reflection surface 11S is emerged from the display body 10 into air as the outgoing light Lout.

When the refraction angle of the incident light Lin is a refraction angle α and the refraction angle of the outgoing light Lout is a refraction angle β, Equation (6) holds for the first occasion, and Equation (7) holds for the second occasion.

$$1 \sin θ = 1.5 \sin α \quad (6)$$

$$1.5 \sin(α-2θ) = \sin β \quad (7)$$

Since the inclination angle θ is 45°, the refraction angle α is 28.13° according to Equation (6). Further, Equation (8) holds when the refraction angle β is 0°.

$$γ = θ + β = 45 \quad (8)$$

Equation (9) is derived by substituting the refraction angle α, the refraction angle β, and Equation (8) into Equation (7).

$$1.5 \sin(28.13-2θ) = 0 \quad (9)$$

The inclination angle θ of the reflection surface 11S obtained from Equation (9) is 14°.

The length in the X direction and the length in the Y direction of a unit cell L1E, in other words, the unit length, are preferably between 1 μm and 300 μm inclusive. When the unit length is 1 μm or more, a plurality of pixels 11A arranged on the display surface 10S is less likely to produce diffracted light, limiting the possibility that the visibility of the image P is lowered by diffracted light emerged from the display body 10. When the unit length is 300 μm or less, the pixels 11A are unlikely to be visually recognized, and the resolution of the display body 10 is not low.

Second Embodiment

A display body according to a second embodiment will now be described with reference to FIGS. 19 and 20. The image displayed by the display body is not limited to a raster image composed of repeated pixels, which are examples of display regions, and may be a vector image composed of a collection of display regions represented by vectors. For convenience of explanation, the following description on a display body uses a pixel as an example of a display region and uses a collection of pixels for displaying an image in a single reflection direction as an example of a display pixel group. The configuration of the reflection surface forming a pixel is the same as that of the first embodiment. That is, the traveling direction of the light reflected by the reflection surface may be the direction in which light is diffracted by the reflection surface or may be a direction different from the direction in which light is diffracted by the reflection surface. In the following example, the traveling direction of reflected light coincides with the traveling direction of diffracted light. The accompanying drawings are not necessarily to scale and may include enlarged views of characteristic parts of the display body in order to clearly show its features.

Figure 19:
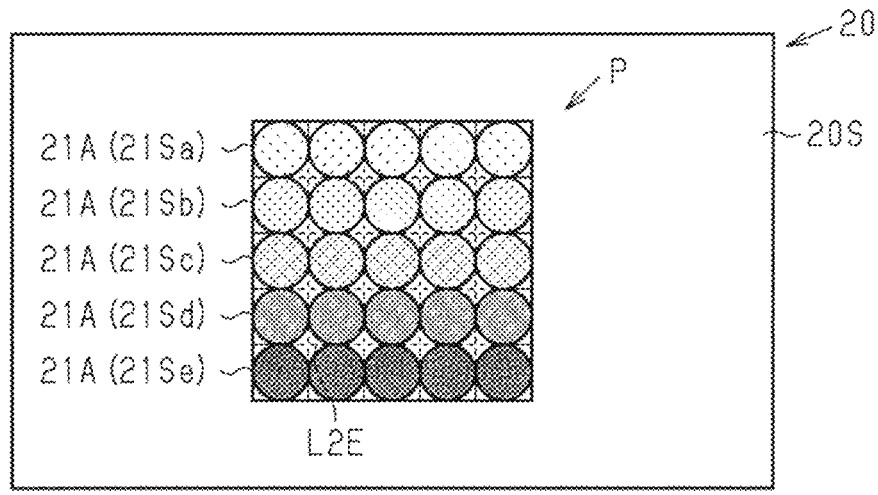
FIG. 19 is a schematic view showing the configuration of unit cells of a display body of a second embodiment.

FIG. 19 shows a display body 20 having a display surface 20S on which pixels 21A are arranged in five lateral lines and five vertical lines. That is, in a plan view of the display surface 20S, pixels 21A are arranged in a matrix. The optical effect of the pixels 21A displays on the display surface 20S a dynamic image that changes continuously in accordance with changes in the direction in which the display body 20 is observed. The image has a polygonal pattern formed by a matrix of rectangular shapes.

The display surface 20S has a plurality of pixel groups 21Sa, 21Sb, 21Sc, 21Sd and 21Se, each associated with a corresponding one of the tones in the image to be displayed. The pixels 21A forming the pixel groups 21Sa to 21Se are located in their respective unit cells L2E, which are cells in a matrix of five vertical lines and five lateral lines. That is, each unit cell L2E includes one pixel 21A.

In the present embodiment, of the pixels 21A shown in FIG. 19, all the pixels 21A arranged in the lateral direction in the first row form a first pixel group 21Sa. Of the pixels 21A, all the pixels 21A arranged in the lateral direction in the second row form a second pixel group 21Sb. Of the pixels 21A, all the pixels 21A arranged in the lateral direction in the third row form a third pixel group 21Sc. Of the pixels 21A, all the pixels 21A arranged in the lateral direction in the fourth row form a fourth pixel group 21Sd. Of the pixels 21A, all the pixels 21A arranged in the lateral direction in the fifth row form a fifth pixel group 21Se.

The first to fifth pixel groups 21Sa to 21Se continuously vary in orientation of reflection surfaces in this order, and the corresponding diffraction angles β may also continuously vary in this order. Each of the first to fifth pixel groups 21Sa to 21Se displays an image that is perceived with high brightness when the diffraction angle β corresponding to the pixel group coincides with the reflection direction of the display body 20. On the other hand, when the corresponding diffraction angle β does not coincide with the reflection direction of the display body 20, the image displayed by the pixel group 21Sa to 21Se is not easily perceived. That is, each of the first to fifth pixel groups 21Sa to 21Se of the present embodiment displays a binary image of white or black color depending on the reflection direction of the display body 20, so that the image is perceived or not perceived by the observer.

A white image is perceived when the intensity of the reflected light emerged from pixels 21A is relatively high. A black image is perceived when the intensity of the reflected light emerged from the pixels 21A is relatively low and the reflected light is hardly perceived by the observer.

Figure 20:
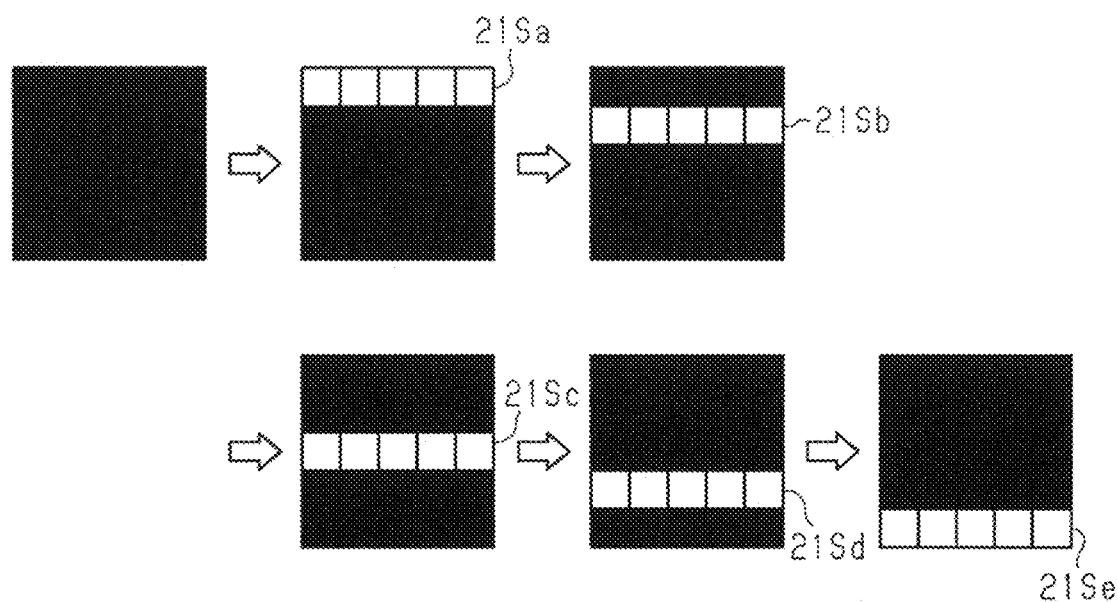
FIG. 20 is a diagram for illustrating an example of a method for dynamically displaying an image with the display body of the second embodiment.

As shown in the leftmost example in FIG. 20, none of the images displayed by the first to fifth pixel groups 21Sa to 21Se is perceived when the display body 20 is observed from the front. All pixel groups 21Sa to 21Se are perceived in black, in other words, in the background color. When the direction in which the display body 20 is observed is shifted gradually from this state, the reflection direction of the display body 20 first coincides with the direction corresponding to the diffraction angle β of the first pixel group 21Sa, allowing the image displayed by the first pixel group 21Sa to be perceived with high brightness. As the direction in which the display body 20 is observed is further shifted, the reflection direction of the display body 20 coincides successively with the directions corresponding to the diffraction angles β of the second to fifth pixel groups 21Sb to 21Se, allowing the images displayed by the second to fifth pixel groups 21Sb to 21Se to be perceived successively with high brightness.

That is, in this example, when the direction in which the display body 20 is observed is shifted gradually, laterally-extending element images are perceived successively as a dynamic image that moves from the upper side to the lower side of the display surface 20S as viewed in the figure.

The effect that allows perception of the dynamic image that moves from the upper side to the lower side as viewed in the figure is achieved by the structure in which the inclination angles θ of reflection surfaces 11S vary sequentially in the order of the rows. This visual effect is also achievable with a structure in which the light reflected by a reflection surface 11S travels in a direction that differs from the direction in which light is diffracted by the reflection surface 11S.

As described above, the second embodiment has the following advantage.

(9) In the image that is displayed when the direction in which the display body 20 is observed is changed, the types of the element images are identical, and the positions of the element images differ from one another according to the reflection directions. Thus, when the direction in which the display body 20 is observed is changed, images of related but different contents are displayed.

The second embodiment may also be formed as follows.

The following modifications may be used as a structure with which an image of a polygonal pattern is displayed dynamically when the direction in which the display body 20 is observed is continuously shifted.

Figure 21A:
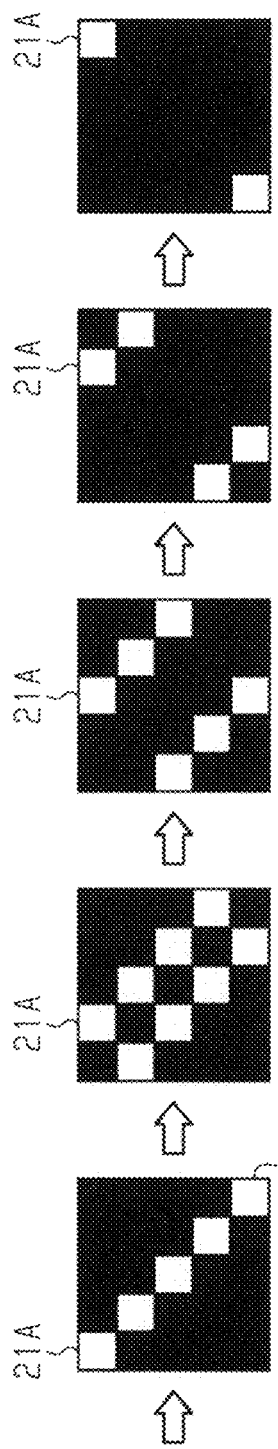
FIGS. 21A to 21C are diagrams each illustrating an example of a method for dynamically displaying an image with a display body of a modification of the second embodiment.

FIG. 21A shows the first example of a display body. Of the pixels 21A arranged in a matrix, the pixels 21A on the diagonal line connecting the upper left corner to the lower right corner as viewed in the figure moves toward the upper right and toward the lower left in the dynamic image as the reflection direction of each display region group changes.

Figure 21B:
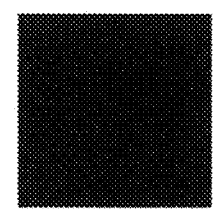

FIG. 21B shows the second example. In this display body, when the reflection direction of each display region group changes, the binary images of the pixels 21A arranged in a matrix are switched such that black images and white images are evenly distributed over the display surface 20S.

That is, each of the pixels 21A arranged in a matrix displays a binary image of white or black color depending on the reflection direction of the display region group, so that the image is perceived or not perceived by the observer.

Figure 21C:
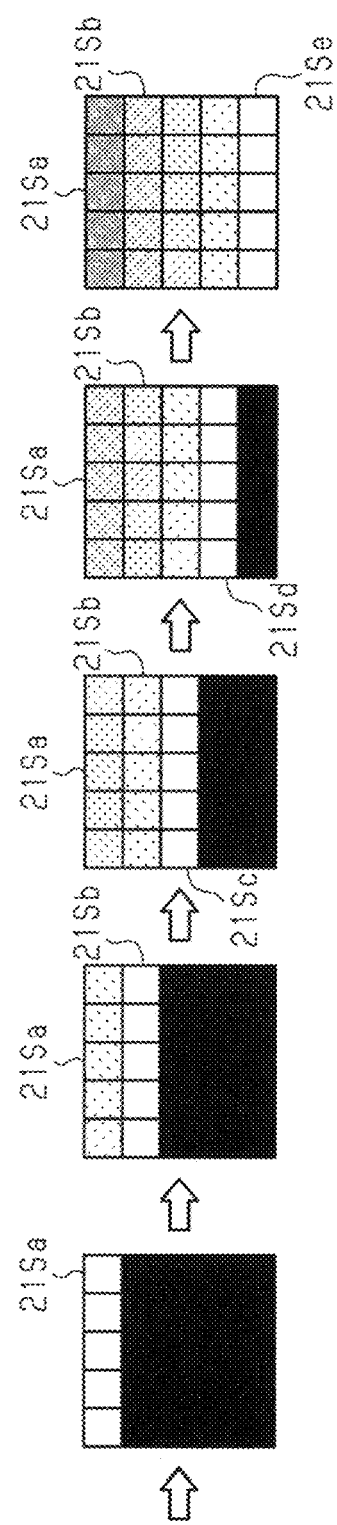

FIG. 21C shows the third example. In this display body, as the reflection direction of each display region group changes, each laterally-extending image moves from the upper side to the lower side of the display surface 20S as viewed in the figure. In addition, the trajectory of the movement of the image is expressed by the gradation of light and shade of images, that is, the variation in intensity of the reflected light beams.

This may be achieved by reducing the differences between the diffraction angles β of the first to fifth pixel groups 21Sa to 21Se. With this structure, as shown in the leftmost example in FIG. 21C, none of the images displayed by the first to fifth pixel groups 21Sa to 21Se is perceived when the display body 20 is observed from the front. All pixel groups 21Sa to 21Se are perceived in black, in other words, in the background color. When the direction in which the display body 20 is observed is shifted gradually from this state, the reflection direction of the display body 20 coincides with the direction corresponding to the diffraction angle β of the first pixel group 21Sa, allowing the image displayed by the first pixel group 21Sa to be perceived with high brightness.

When the direction in which the display body 20 is observed is further shifted from this state, the direction in which the display body 20 is observed coincides with the direction corresponding to the diffraction angle β of the second pixel group 21Sb, allowing the image displayed by the second pixel group 21Sb to be perceived with high brightness. At this time, since the difference between the direction in which the display body 20 is observed and the direction corresponding to the diffraction angle β of the first pixel group 21Sa is small, the image displayed by the first pixel group 21Sa is also perceived with a slightly reduced brightness. That is, the image displayed by the first pixel group 21Sa is perceived as an image that has a lower brightness than the image displayed by the second pixel group 21Sb and has a higher brightness than the images displayed by the third to fifth pixel groups 21Sc to 21Se.

When the direction in which the display body 20 is observed is further shifted from this state, the reflection direction of the display body 20 coincides with the direction corresponding to the diffraction angle β of the third pixel group 21Sc, allowing the image displayed by the third pixel group 21Sc to be perceived with high brightness. Again, since the difference between the direction in which the display body 20 is observed and the direction corresponding to the diffraction angle β of the second pixel group 21Sb is small, the image displayed by the second pixel group 21Sb is also perceived with a slightly reduced brightness. Further, since the difference between the direction in which the display body 20 is observed and the direction corresponding to the diffraction angle β of the first pixel group 21Sa is still relatively small, the image displayed by the first pixel group 21Sa is also perceived with a further reduced brightness. That is, the images displayed by the first to third pixel groups 21Sa, to 21Sc are perceived, with the image of the third pixel group 21Sc having the highest brightness, followed by the image of the second pixel group 21Sb and then the image of the first pixel group 21Sa.

That is, with this configuration, when the direction in which the display body 20 is observed coincides with the direction corresponding to the diffraction angle β of one of the first to fifth pixel groups 21Sa to 21Se, the differences between the observation direction and the directions corresponding to the diffraction angles β of the other pixel groups 21Sa to 21Se are relatively small. Consequently, as the direction in which the display body 20 is observed is further shifted, after the image of one of the first to fifth pixel groups 21Sa to 21Se is displayed with high brightness, the image of this pixel group is perceived with a reduced brightness together with the image displayed by another pixel group.

Third Embodiment

A display body according to a third embodiment will now be described with reference to FIGS. 22 and 23. The image displayed by the display body is not limited to a raster image composed of repeated pixels, which are examples of display regions, and may be a vector image composed of a collection of display regions represented by vectors. For convenience of explanation, the following description on a display body uses a pixel as an example of a display region and uses a collection of pixels for displaying an image in a single reflection direction as an example of a display pixel group. The configuration of the reflection surface forming a pixel is the same as that of the first embodiment. That is, the traveling direction of the light reflected by the reflection surface may be the direction in which light is diffracted by the reflection surface or may be a direction different from the direction in which light is diffracted by the reflection surface. In the following example, the traveling direction of reflected light coincides with the traveling direction of diffracted light. The accompanying drawings are not necessarily to same scale or aspect ratio as actual and may include enlarged views of characteristic parts of the display body in order to clearly show its features.

Figure 22:
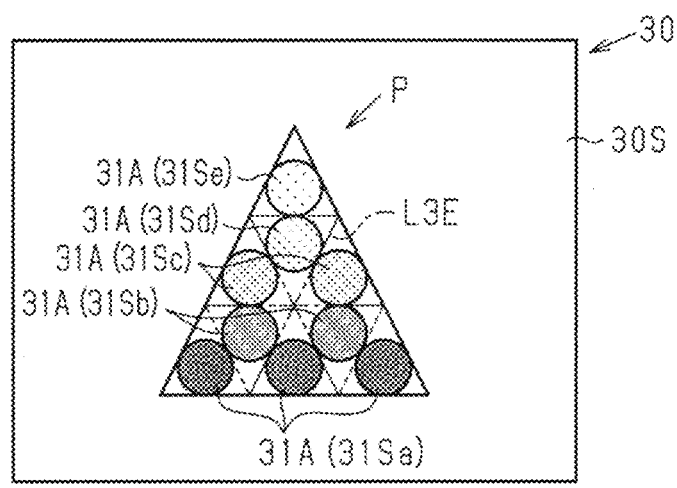
FIG. 22 is a schematic view showing the configuration of unit cells of a display body of a third embodiment.

As shown in FIG. 22, a display body 30 includes a display surface 30S, in which a plurality of pixels 31A is arranged in a matrix. Each pixel 31A is located in a unit cell L3E of a triangular lattice. The optical effect of the pixels 31A displays on the display surface 30S a dynamic image that varies continuously in accordance with shifts in the direction in which the display body 30 is observed. The image has a polygonal pattern in which multiple pixels 31A are combined.

The display surface 30S has a plurality of pixel groups 31Sa to 31Se, each associated with a corresponding one of the tones in the image to be displayed. The pixels 31A forming the pixel groups 31Sa to 31Se are located in their respective unit cell L3E, which are cells in the matrix. That is, each unit cell L3E includes one pixel 31A.

In the present embodiment, of the pixels 31A shown in FIG. 22, all the pixels arranged in the lateral direction in the bottom row as viewed in the figure form a first pixel group 31Sa. Of the pixels 31A, all the pixels arranged in the lateral direction in the second row from the bottom as viewed in the figure form a second pixel group 31Sb. Of the pixels 31A, all the pixels arranged in the lateral direction in the third row from the bottom as viewed in the figure form a third pixel group 31Sc. Of the pixels 31A, the pixel arranged in the lateral direction in the fourth row from the bottom as viewed in the figure forms a fourth pixel group 31Sd. Of the pixels 31A, the pixel in the top row as viewed in the figure forms a fifth pixel group 31Se.

The first to fifth pixel groups 31Sa to 31Se continuously vary in orientation of reflection surfaces in this order, and the corresponding diffraction angles β also vary continuously in this order. Each of the first to fifth pixel groups 31Sa to 31Se displays an image that is perceived with high brightness when the corresponding diffraction angle β coincides with the reflection direction of the display region group. When the corresponding diffraction angle β does not coincide with the reflection direction of the display region group, the image displayed by the pixel group 31Sa to 31Se is not easily perceived. That is, each of the first to fifth pixel groups 31Sa to 31Se of the present embodiment displays a binary image of white or black color depending on the direction in which the display body 30 is observed, so that the image is perceived or not perceived by the observer.

Figure 23:
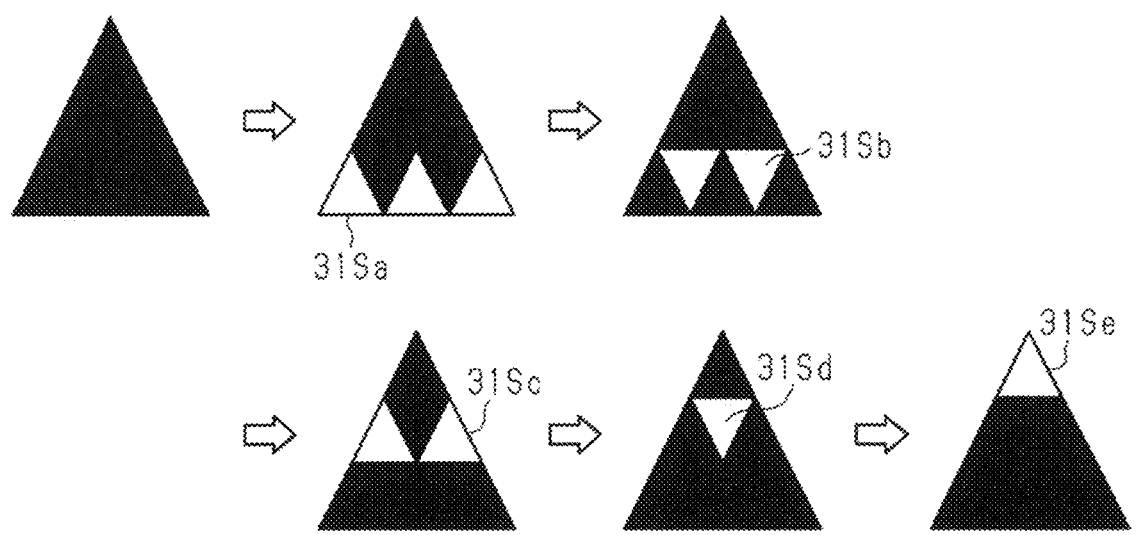
FIG. 23 is a diagram for illustrating an example of a method for dynamically displaying an image with the display body of the third embodiment.

As shown in the leftmost example in FIG. 23, none of the images displayed by the first to fifth pixel groups 31Sa to 31Se is perceived when the display body 30 is viewed from the front. All pixel groups 31Sa to 31Se are perceived in black, in other words, in the background color. When the direction in which the display body 30 is observed is shifted gradually from this state, the direction in which the display body 30 is observed coincides with the direction corresponding to the diffraction angle β of the first pixel group 31Sa, allowing the image displayed by the first pixel group 31Sa to be perceived with high brightness. Then, as the direction in which the display body 30 is observed is further shifted, the observation direction successively coincides with the directions corresponding to the diffraction angles β of the second to fifth pixel groups 31Sb to 31Se, allowing the images displayed by the second to fifth pixel groups 31Sb to 31Se to be perceived with high brightness.

That is, in this example, as the direction in which the display body 30 is observed is shifted gradually, laterally-extending element images are perceived successively as a dynamic image that moves from the bottom row to the top row in the display surface 30S as viewed in the figure.

The effect that allows perception of the dynamic image that moves from the upper side to the lower side as viewed in the figure is achieved by the structure in which the inclination angles θ of reflection surfaces 11S vary sequentially in the order of the rows. This visual effect is also achievable with a configuration in which the light reflected by the reflection surface 11S travels in a direction that differs from the direction in which light is diffracted by the reflection surface 11S.

As described above, the third embodiment has the same advantage as the second embodiment.

The third embodiment may also be formed as follows.

The following modifications may be used as a structure with which an image of a polygonal pattern is displayed dynamically when the direction in which the display body 30 is observed is continuously shifted.

Figure 24A:
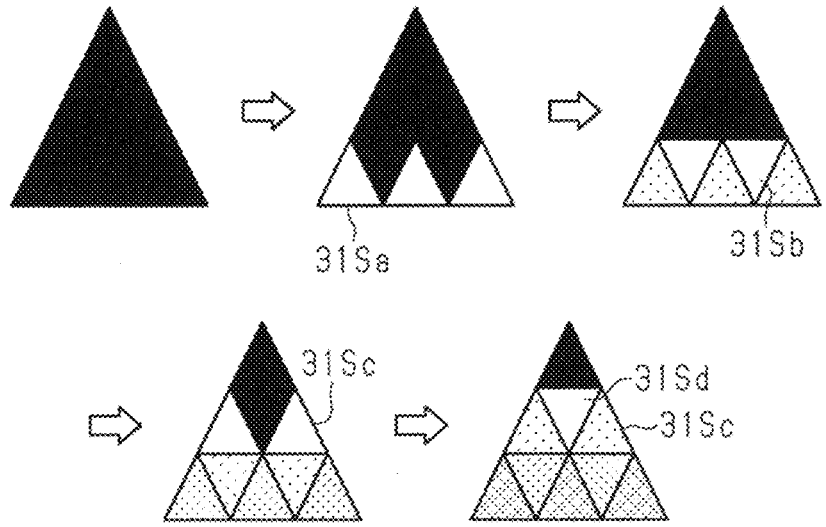
FIG. 24A is a diagram for illustrating an example of a method for dynamically displaying an image with a display body of a modification of the third embodiment.

FIG. 24A shows the first example. In this display body, laterally-extending images move from the bottom row to the top row of the display surface 30S as viewed in the figure as the direction in which the display body is observed is shifted. In addition, the trajectory of the movement of each image is expressed with the gradation of light and shade, that is, the intensities of the reflected light beams.

This may be achieved by reducing the differences between the diffraction angles β corresponding to the first to fifth pixel groups 31Sa to 31Se. As shown in the leftmost example in FIG. 24A, none of the images displayed by the first to fifth pixel groups 31Sa to 31Se is perceived when the display body 30 is observed from the front. All pixel groups 31Sa to 31Se are perceived in black, in other words, in the background color.

When the direction in which the display body 30 is observed is shifted gradually from this state, the direction in which the display body 30 is observed first coincides with the direction corresponding to the diffraction angle β of the first pixel group 31Sa, allowing the image displayed by the first pixel group 31Sa to be perceived with high brightness.

When the direction in which the display body 30 is observed is further shifted from this state, the direction in which the display body 30 is observed coincides with the direction corresponding to the diffraction angle β of the second pixel group 31Sb, allowing the image displayed by the second pixel group 31Sb to be perceived with high brightness. At this time, since the difference between the direction in which the display body 30 is observed and the direction corresponding to the diffraction angle β of the first pixel group 31Sa is small, the image displayed by the first pixel group 31Sa is also perceived with a slightly reduced brightness. That is, the image displayed by the first pixel group 31Sa is perceived as an image that has a lower brightness than the image displayed by the second pixel group 31Sb and has a higher brightness than the images displayed by the third to fifth pixel groups 31Sc to 31Se.

When the direction in which the display body 30 is observed is further shifted from this state, the direction in which the display body 30 is observed coincides with the direction corresponding to the diffraction angle β of the third pixel group 31Sc, allowing the image displayed by the third pixel group 31Sc to be perceived with high brightness. Again, since the difference between the direction in which the display body 30 is observed and the direction corresponding to the diffraction angle R of the second pixel group 31Sb is small, the image displayed by the second pixel group 31Sb is also perceived with a slightly reduced brightness. Further, since the difference between the direction in which the display body 30 is observed and the direction corresponding to the diffraction angle β of the first pixel group 31Sa is still relatively small, the image displayed by the first pixel group 31Sa is also perceived with a further reduced brightness.

That is, with this configuration, when the reflection direction of each display region group coincides with the direction corresponding to the diffraction angle β of one of the first to fifth pixel groups 31Sa to 31Se, the differences between the reflection direction and the directions corresponding to the diffraction angles β of the other pixel groups are relatively small. Consequently, as the direction in which the display body is observed is gradually shifted, after the image of one of the first to fifth pixel groups 31Sa to 31Se is displayed with high brightness, the image of this pixel group is perceived with a reduced brightness together with the image displayed by another pixel group.

Figure 24B:
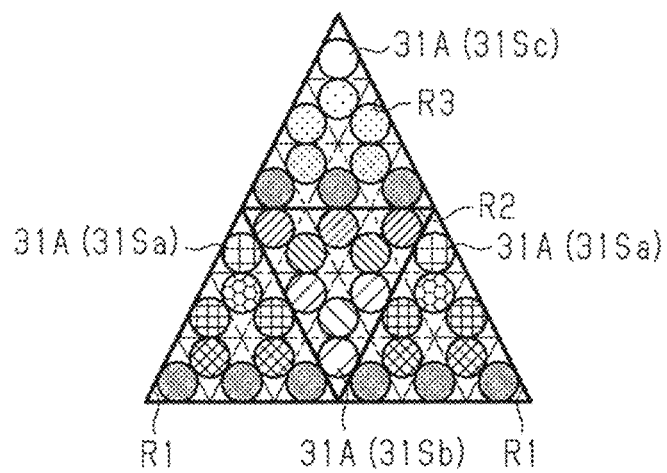
FIG. 24B is a schematic view showing the configuration of unit cells of a display body of a modification of the third embodiment.

FIG. 24B shows the second example. In this display body, a collection of pixels 31A is arranged in a pyramid shape. Parts of the collection each function as one of three regions R1, R2 and R3. In each of the regions R1, R2 and R3, the orientations of the reflection surfaces of the pixels 31A vary in steps of constant rate with respect to the pixel in the top row as viewed in the figure. As such, when viewed from a given reflection direction, the collection of the pixels 31A in each region displays an image with a gradation of light and shade, in other words, an image with various intensities of reflected light beams. The regions located on the left and right sides in the lower row are regions R1. The pixel 31A in the top row in each region R1 forms a first pixel group 31Sa.

The region in the middle in the lower row is the region R2. The pixel 31A in the bottom row in the region R2 forms a second pixel group 31Sb. The region in the upper row is the region R3, and the pixel 31A in the top row in the region R3 forms a third pixel group 31Sc. The first to third pixel groups 31Sa to 31Sc continuously vary in orientation of reflection surfaces in this order, and the corresponding diffraction angles β also vary continuously in this order.

Figure 24C:
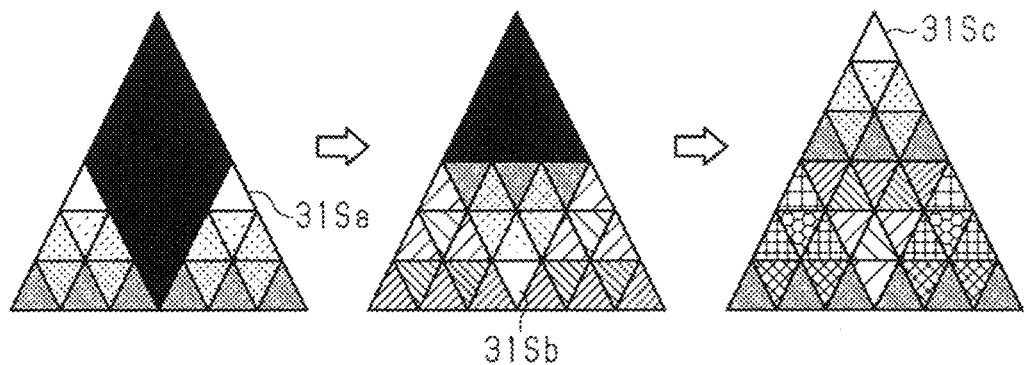
FIG. 24C is a diagram for illustrating an example of a method for dynamically displaying an image with the display body shown in FIG. 24B.

As shown in the leftmost example in FIG. 24C, when the display body 30 is observed from the front, the direction in which the display body 30 is observed coincides with the direction corresponding to the diffraction angle β of the first pixel group 31Sa. At this time, the collection of the first pixel group 31Sa and the pixels 31A, the reflection surfaces of which vary in steps of uniform rate with respect to the first pixel group 31Sa in orientation, in each region R1 is perceived with high brightness.

When the direction in which the display body 30 is observed is shifted gradually from this state, the direction in which the display body 30 is observed coincides with the direction corresponding to the diffraction angle β of the second pixel group 31Sb. At this time, the collection of the second pixel group 31Sb and the pixels 31A, the reflection surfaces of which vary in steps of uniform rate with respect to the second pixel group 31Sb in orientation, in the region R2 is perceived with high brightness. The difference between the direction in which the display body 30 is observed and the direction corresponding to the diffraction angle β of the first pixel group 31Sa is small. Thus, the image displayed by the collection of the first pixel group 31Sa and the pixels 31A, the reflection surfaces of which vary in steps of uniform rate with respect to the first pixel group 31Sa in orientation, in each region R1 is also perceived with a slightly reduced brightness.

When the direction in which the display body 30 is observed is further shifted from this state, the direction in which the display body 30 is observed coincides with the direction corresponding to the diffraction angle β of the third pixel group 31Sc. At this time, the image displayed by the collection of the third pixel group 31Sc and the pixels 31A, the reflection surfaces of which vary in steps of uniform rate with respect to the third pixel group 31Sc in orientation, in the region R3 is perceived with high brightness. Again, the difference between the direction in which the display body 30 is observed and the direction corresponding to the diffraction angle β of the second pixel group 31Sb is small. Thus, the image displayed by the collection of the second pixel group 31Sb and the pixels 31A, the reflection surfaces of which vary in steps of uniform rate with respect to the second pixel group 31Sb in orientation, in the region R2 is also perceived with a slightly reduced brightness.

In addition, the difference between the direction in which the display body 30 is observed and the direction corresponding to the diffraction angle β of the first pixel group 31Sa is still relatively small. Thus, the image displayed by the collection of the first pixel group 31Sa and the pixels 31A, the reflection surfaces of which vary in steps of uniform rate with respect to the first pixel group 31Sa in orientation, in each region R1 is also perceived with a further reduced brightness.

That is, with this configuration, when the direction in which the display body 30 is observed coincides with the direction corresponding to the diffraction angle β of one of the first to third pixel groups 31Sa to 31Sc, the differences between the observation direction and the directions corresponding to the diffraction angles β of the other pixel groups are relatively small. Consequently, as the direction in which the display body 30 is observed is gradually shifted, after the image of one of the first to third pixel groups 31Sa to 31Sc is displayed with high brightness, this image is perceived with a reduced brightness together with an image displayed by another pixel group.

Fourth Embodiment

A display body according to a fourth embodiment will now be described with reference to FIGS. 25A to 25C. The image displayed by the display body is not limited to a raster image composed of repeated pixels, which are examples of display regions, and may be a vector image composed of a collection of display regions represented by vectors. For convenience of explanation, the following description on a display body uses a pixel as an example of a display region and uses a collection of pixels for displaying an image in a single reflection direction as an example of a display pixel group. The configuration of the reflection surface forming a pixel is the same as that of the first embodiment. That is, the traveling direction of the light reflected by the reflection surface may be the direction in which light is diffracted by the reflection surface or may be a direction different from the direction in which light is diffracted by the reflection surface. In the following example, the traveling direction of reflected light coincides with the traveling direction of diffracted light. The accompanying drawings are not necessarily to scale and may include enlarged views of characteristic parts of the display body in order to clearly show its features.

Figure 25A:
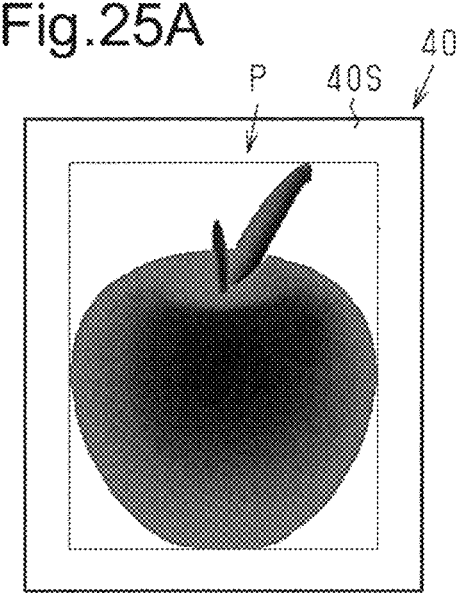
FIGS. 25A to 25C are diagrams for illustrating an example of a method for dynamically displaying an image with a display body of a fourth embodiment.
Figure 25B:
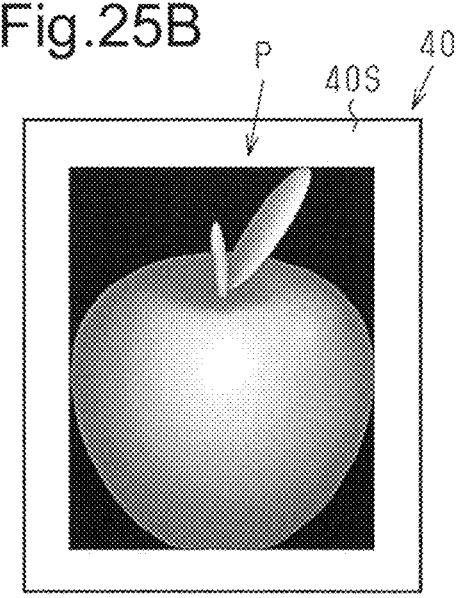
Figure 25C:
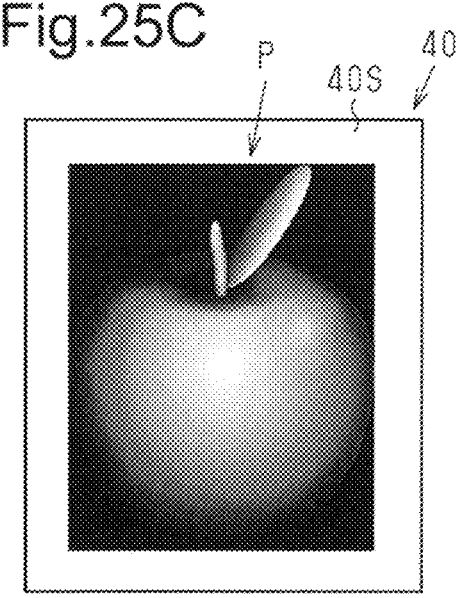

FIG. 25A shows a display body 40 that displays an image P representing a geometric three-dimensional structure as the element image. The display body 40 has pixels that differ from one another in orientation of the reflection surfaces, which are associated with regions of the image P that differ from one another in depth information. In the present embodiment, the geometric three-dimensional structure is an apple. In order to represent the depth information of the three-dimensional structure by converting it into a gradation of light and shade, an appropriate tone value is set in advance for each region of the three-dimensional structure. Each preset tone value is associated with an orientation of the reflection surface of a pixel. The tone values of regions correspond to the tone values of the image used in the manufacturing of the display body 40.

The tone values of regions of the three-dimensional structure may be expressed as follows. In the following description, a method for expressing a 256 gradation, which is an example of a gradation, is described.

As described above, when the inclination angle θ between the display surface 40S of the display body 40 and the horizontal plane HR is about 45° and the display body 40 is observed from the first observation side, the azimuth angle Φ of a reflection surface 11S interrelates with the intensity of light observed by the observer OB as follows. That is, when the azimuth angle Φ of a reflection surface 11S is 180°, the observer OB perceives the light with the highest intensity. The greater the difference between the azimuth angle Φ of a reflection surface 11S and 180°, the lower the intensity of light perceived by the observer OB.

Since the display body 40 is manufactured so as to provide 256 tones in the image, when the azimuth angles Φ of all the reflection surfaces 11S of the display body 40 are within the range of 90° and 180° inclusive, the azimuth angle Φ per tone is about 0.35°. The azimuth angle Φ per tone is calculated by dividing 90° by 255. Tone 0 corresponds to 90°, and tone 255 corresponds to 180°. Thus, a reflection surface 11S having an azimuth angle Φ of 90.35° may be used for the region in the image where the tone value is 1, and a reflection surface 11S having an azimuth angle Φ of 125° may be used for the region in the image where the tone value is 100.

The tones and the actual intensities, which are determined by the azimuth angles Φ, do not have to have a one-to-one correspondence. For example, when the maximum tone value is 100, a reflection surfaces 11S having an azimuth angle Φ of 180° may be used for the region in the image where the tone value is 100. In this case, the azimuth angle Φ per tone can be calculated by dividing 90° by the value obtained by subtracting the minimum tone value from the maximum tone value.

In the present embodiment, as shown in FIG. 25A, when the display body 40 is viewed from the front, the entire image of the three-dimensional structure in the display surface 40S is perceived with low brightness. On the other hand, the entire region in the display surface 40S that is the background of the three-dimensional structure is perceived with high brightness.

Then, as the direction in which the display body 40 is observed is gradually shifted from this state, the directions corresponding to the diffraction angles β of the pixels associated with the regions in the image P of the three-dimensional structure become close to the direction in which the display body 40 is observed, as compared with the directions corresponding to the diffraction angles β of the pixels associated with the regions in the background of the three-dimensional structure. Accordingly, as shown in FIG. 25B, light and dark are inverted in the regions of the image P of the three-dimensional structure and the background region of the three-dimensional structure displayed by the display body 40.

As the direction in which the display body 40 is observed is further shifted from this state, the direction in which the display body 40 is observed becomes different from the directions corresponding to the diffraction angles β of the pixels associated with the shaded region in the image P of the three-dimensional structure, reducing the brightness of the shaded region in the image P of the three-dimensional structure. Accordingly, as shown in FIG. 25C, the contrast of light and dark between the regions of the three-dimensional structure displayed by the display body 40 becomes clearer.

This visual effect that defines the direction of the movement of shades in the image is achieved by the inclination angles θ of the reflection surfaces 11S of the pixels 11A that have a certain interrelation and vary sequentially with predetermined regularity. This visual effect of defining the direction of movement of shades in the image is also achievable by a structure in which the traveling direction of the light reflected by the reflection surface 11S differs from the direction of light diffracted by the reflection surface 11S.

As described above, the fourth embodiment has the following advantages.

(10) The image includes element images of the same type, and the element images have different shades depending on the direction in which the display body 40 is observed. Thus, when the reflection direction is changed, images of related but different contents are displayed.

(11) As the direction in which the display body 40 is observed is gradually varied, the contrast in the image also varies. The contrast in the image is produced by the degrees of light and dark in the regions in the image P of the three-dimensional structure. Accordingly, the image P is displayed as a three-dimensional image, and the observer's perception of the image varies significantly as the reflection direction of the display body 40 shifts.

The fourth embodiment may also be formed as follows.

The embodiment may be configured such that a region that has the highest lightness when the display body 40 is observed from a given reflection direction has the lowest lightness when the display body 40 is observed from a different reflection direction. Likewise, a region that has the lowest lightness when the display body 40 is observed from a given reflection direction may have the highest lightness when the display body 40 is observed from a different reflection direction. Furthermore, the region that has the highest or lowest lightness when the display body 40 is observed in a given reflection direction may have the lightness of the intermediate value of the lightness values of the pixels in the display surface 40S when the display body 40 is observed from a different reflection direction.

Figure 26:
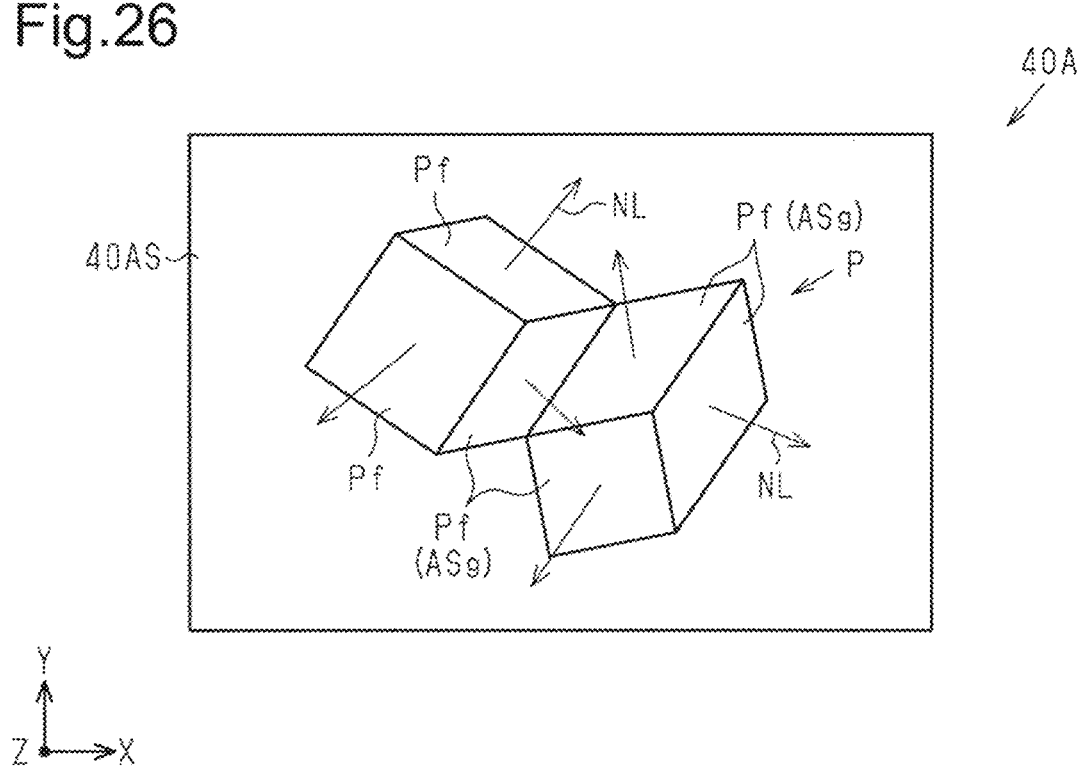
FIG. 26 is a schematic view showing a display body of a modification of the fourth embodiment and an image displayed by the display body.

FIG. 26 shows a display body 40A that displays an image P on the display surface 40AS. The image P may be of a polyhedron including a plurality of surfaces Pf. In this modification, the image P includes two hexahedrons. One side of one of the hexahedrons is shared with the other.

The image P includes a plurality of display region groups ASg, each formed by a plurality of pixels for displaying one surface Pf. The reflection surfaces of the plurality of pixels belonging to each display region group ASg have an azimuth angle (that is common to the display region group ASg. In other words, each display region group ASg has an azimuth angle Φ unique to the display region group ASg. The azimuth angle Φ in each display region group ASg corresponds to the normal direction NL to the surface Pf forming the polyhedron of the image P.

Figure 27:
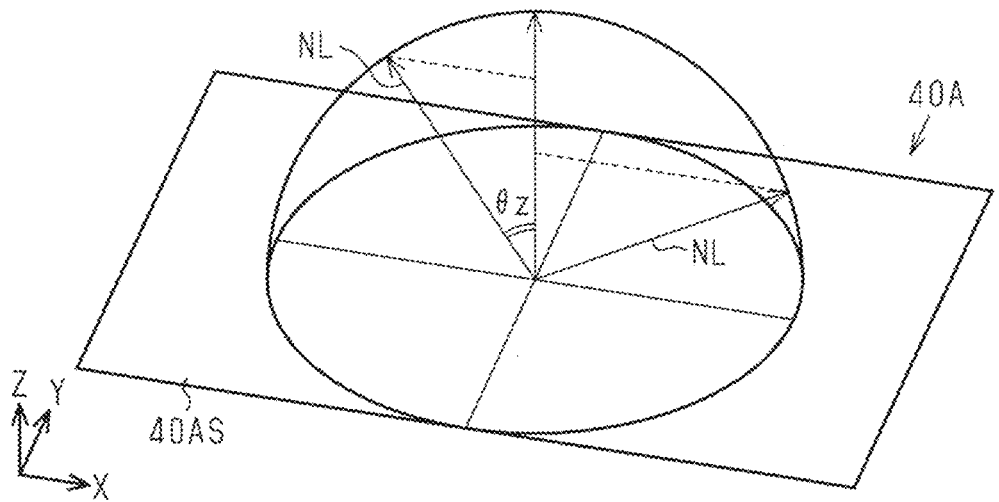
FIG. 27 is a diagram for illustrating a zenith angle formed by the Z direction and the normal direction to a surface forming the image displayed by the display body of a modification of the fourth embodiment.

Specifically, as shown in FIG. 27, in a hemisphere protruding in the Z direction from the XY plane including the display surface 40AS of the display body 40A, the angle formed by the Z direction and the normal direction NL to each surface Pf is referred to as a zenith angle θz. A unique azimuth angle Φ is set for each surface Pf, or display region group ASg, such that when a surface Pf have a larger zenith angle θz, the intensity of the light that is emerged by the surface Pf and perceived by the observer OB is lower. This allows the display body 40A to display the image P of the polyhedron formed by a plurality of surfaces Pf. In the example described above, the observer OB observes the display body 40A from such a direction that the plane including the observation direction is perpendicular to the display surface 40AS, in other words, from the Z direction.

Fifth Embodiment

A display body according to a fifth embodiment will now be described with reference to FIGS. 28 and 29. The image displayed by the display body is not limited to a raster image composed of repeated pixels, which are examples of display regions, and may be a vector image composed of a collection of display regions represented by vectors. For convenience of explanation, the following description on a display body uses a pixel as an example of a display region and uses a collection of pixels for displaying an image in a single reflection direction as an example of a display pixel group. The configuration of the reflection surface forming a pixel is the same as that of the first embodiment. That is, the traveling direction of the light reflected by the reflection surface may be the direction in which light is diffracted by the reflection surface or may be a direction different from the direction in which light is diffracted by the reflection surface. In the following example, the traveling direction of reflected light coincides with the traveling direction of diffracted light. The accompanying drawings are not necessarily to scale and may include enlarged views of characteristic parts of the display body in order to clearly show its features.

Figure 28:
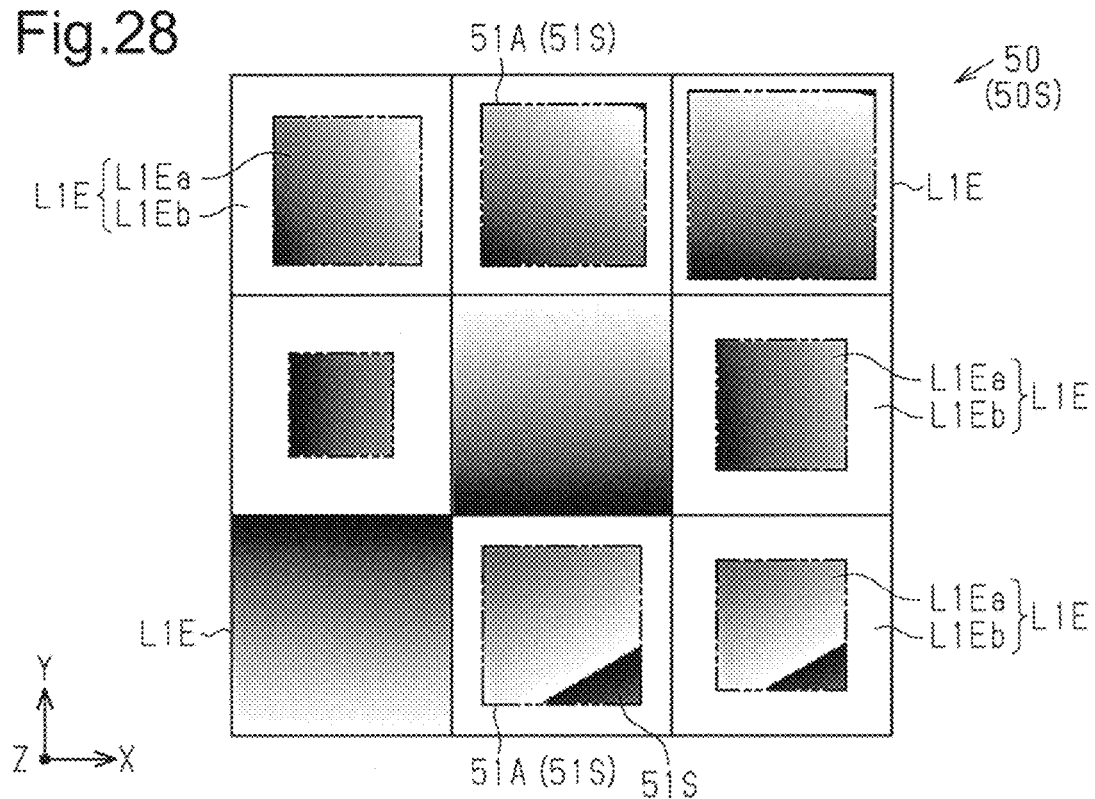
FIG. 28 is a schematic view showing the configuration of unit cells of a display body of a fifth embodiment.

In FIG. 28, for the sake of convenience of illustrating the variation in height of a pixel using a plane, the heights are expressed with gradations of lightness such that a position in a pixel that has a greater height in the Z direction has a lower lightness, in the same manner as FIG. 8.

The display body of the fifth embodiment displays a three-dimensional image, which is an image of a three-dimensional structure, as with the display body 40 of the fourth embodiment. Furthermore, this display body displays different first and second images depending on the tilting state of the display body, as with the display body 10A of a modification of the first embodiment.

As shown in FIG. 28, a plurality of pixels 51A may include a pixel 51A that is not large enough to occupy the largest area in the unit cell L1E as viewed in the Z direction. Each unit cell L1E includes a pixel region L1Ea, where a pixel 51A is located, and a surrounding region L1Eb, which is the region outside the pixel region L1Ea. The pixel region L1Ea and the unit cell L1E are similar or identical in shape. That is, the pixel region L1Ea is square and smaller than the unit cell L1E.

The pixel region L1Ea and the unit cell L1E share the same center, all the sides defining the pixel region L1Ea are located in the unit cell L1E so as to be parallel to at least one of the sides of the unit cell L1E. In each pixel region L1Ea, the pixel 51A is sized to occupy the largest area in the pixel region L1Ea as viewed in the Z direction. That is, when a pixel 51A includes a plurality of reflection sections, the reflection sections are sized such that the area of reflection surfaces 51S in the pixel 51A is maximized.

The surrounding region L1Eb is shaped as a square frame and located on the outer side of the entire edge of the pixel region L1Ea. In other words, the surrounding region L1Eb surrounds the pixel region L1Ea.

As such, when the azimuth angles Φ of the reflection surfaces 51S are identical, the area of the reflection surface 51S of the pixel 51A located in a pixel region L1Ea that is smaller than the unit cell L1E is smaller than the area of the reflection surface 51S of the pixel 51A that is located in a pixel region L1Ea having the same size as the unit cell L1E. When the observer OB observes from a given observation point, a larger reflection surface 51S increases the intensity of the light emerged from the pixel 51A and observed by the observer OB.

As such, the intensity of light per unit cell L1E may be changed by changing the size of the pixel region L1Ea containing a pixel 51A and thus the size of the reflection surface 51S of the pixel 51A. In addition, it is possible to increase the range of tones in the image P displayed by the display body 50 since the intensity of light per area having the same size as a unit cell L1E can be changed by changing the size of the reflection surface 51S.

Figure 29:
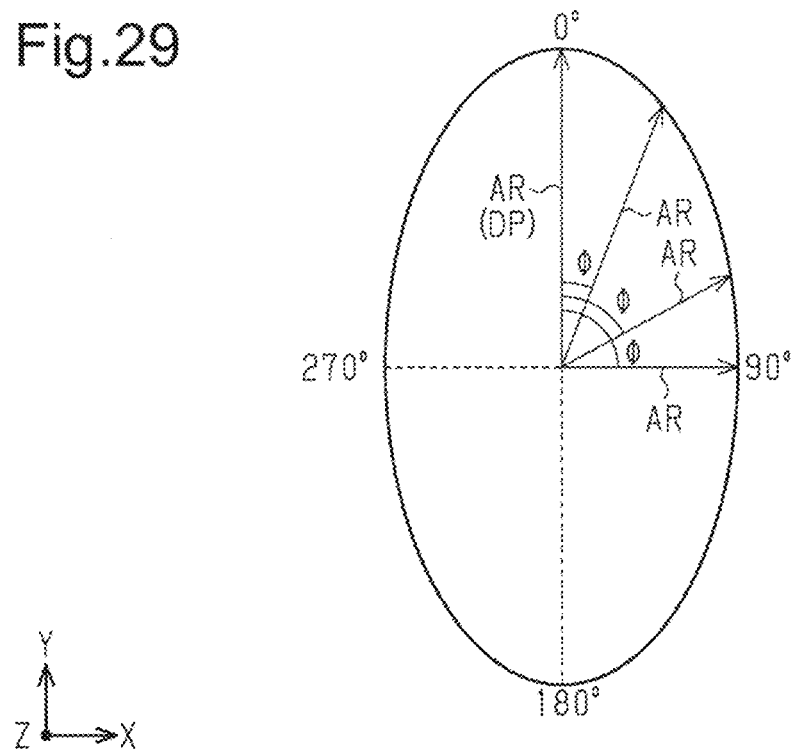
FIG. 29 is a diagram showing an ellipse used to set the sizes of pixel regions in the display body of the fifth embodiment.

As shown in FIG. 29, the area of the reflection surface 51S according to the azimuth angle Φ, in other words, the size of the pixel region L1Ea according to the azimuth angle Φ, may be set using an ellipse having a radius that varies continuously with the azimuth angle Φ. In the ellipse shown in FIG. 29, each arrow AR represents the projection direction DP of a reflection surface 51S. The length of the arrow AR extending to the ellipse is proportional to the size of the pixel region L1Ea. The size of the pixel region L1Ea of each unit cell L1E is set accordingly.

The ratio of the diameter in the X direction and the diameter in the Y direction of the ellipse may be appropriately changed when the size of the pixel region L1Ea is changed corresponding to a change in the azimuth angle Φ per unit angle.

As described above, when the display body 50 is observed from the first observation side such that the inclination angle θ between the display surface 50S and the horizontal plane HR is 45° and the plane including the observation direction is perpendicular to the display surface 50S, a reflection surface 51S with an azimuth angle Φ of 180° provides the highest brightness, and the greater the difference between 180° and an azimuth angle Φ, the lower the brightness of the reflection surface 51S. This observation state is referred to as the first observation state.

In contrast, when the display body 50 is tilted from this state in the front-back direction, a reflection surface 51S with an azimuth angle Φ of 0° provides the highest brightness, and the greater the difference between 0° and an azimuth angle Φ, the lower the brightness of the reflection surface 51S. Specifically, the observer OB tilts the display body 50 such that the section of the display surface 50S of the display body 50 that intersects with the plane including the observation direction and extending along the X direction and the section of the plane including the observation direction that intersects with the display surface 50S remain unchanged. The state of the display body 50 thus tilted is referred to as the second observation state.

Switching the observation state of the display body 50 between the first observation state and the second observation state significantly changes the intensities of the light that is perceived by the observer OB and reflected from the reflection surfaces 51S having azimuth angles Φ of around 0° and the reflection surfaces 51S having azimuth angles Φ of around 180°. In contrast, the intensities of the light reflected from the reflection surfaces 51S having azimuth angles Φ of around 90° and perceived by the observer OB do not significantly change when the observation state of the display body 50 is switched between the first observation state and the second observation state.

Thus, while the observation state of the display body 50 is switched between the first observation state and the second observation state, the reflection surfaces 51S that display the first image and have azimuth angles Φ of around 90° and the reflection surfaces 51S that display the second image and have azimuth angles Φ of around 90° become equivalent in brightness. As such, the images displayed by these reflection surfaces 51S tend to be perceived as one image.

In this respect, according to the ellipse shown in FIG. 29, an azimuth angle closer to 90° results in a smaller pixel region L1Ea, reducing the amount of light emerged by a reflection surface 51S having an azimuth angle of around 90°. This lowers the visibility of the light emerged from reflection surfaces 51S with azimuth angles of around 90°, so that the image displayed by reflection surfaces 51S for displaying the first image and the image displayed by reflection surfaces 51S for displaying the second image are less likely to be perceived as one image. As a result, the visibility of the display body 50 is improved.

Further, in the first and second images, the pixel regions L1Ea for representing sections with lower lightness are smaller in size than the pixel regions L1Ea for representing sections with higher lightness. This increases the contrast in each image as compared with a configuration in which the pixels 51A have pixel regions L1Ea of the same size.

Other Embodiments

The above-described embodiments may be modified as follows.

In each of the embodiments described above, when the pixels 11A, 21A and 31A are made of a material with light reflectivity, the reflection layers may be omitted. Exposed surfaces of the pixels 11A, 21A and 31A may function as reflection surfaces.

In the first embodiment, when the direction in which the display body 10 is observed is varied, the element images in the image are identical in type but differ from one another in shape according to the reflection direction. In the second embodiment, when the direction in which the display body 20 is observed is changed, the element images in the image are identical in type but differ from one another in position according to the reflection direction.

In the fourth embodiment, when the direction in which the display body 40 is observed is changed, the element images in the image are identical in type but differ from one another in shade according to the reflection direction. Alternatively, when the direction in which the display body 10, 20 or 40 is observed is changed, the element images in the image may be identical in type but differ from one another in size or brightness according to the reflection direction. Further, when the direction in which the display body 10, 20 or 40 is observed is changed, the element images in the image may be identical in type but differ from one another in a combination of position, shape, size, light and dark, and shade, which function as control parameters.

In other words, the display body may have any configuration provided that different images corresponding to the directions in which the display body is observed each include an element image, and the element images are identical in type and differ from one another in at least one of position, shape, size, light and dark, and shade.

Figures 30A, 30B, 30C, 30D:
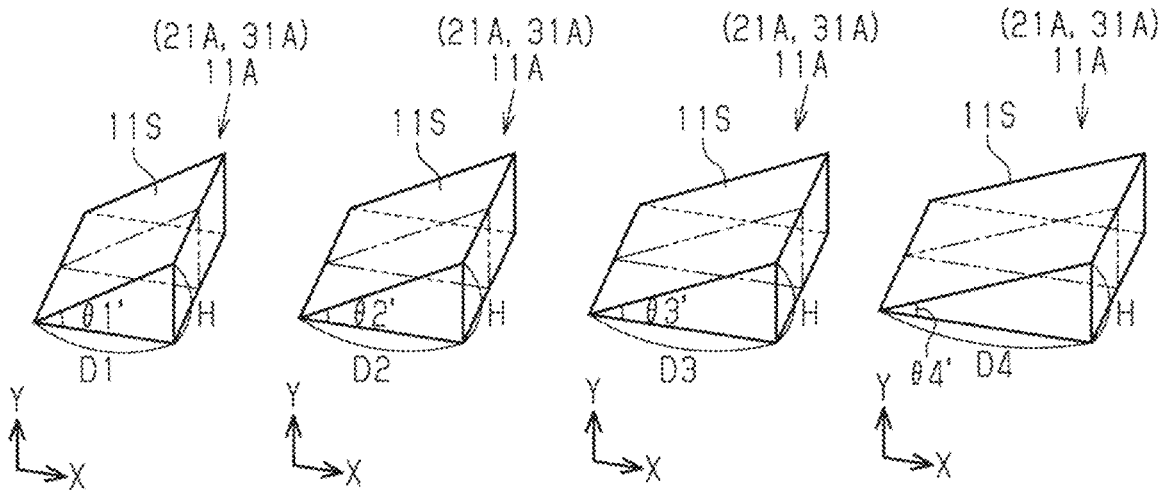
FIGS. 30A to 30D are perspective views showing the structures of pixels, which are associated with tones in the image to be displayed, in a display body of another embodiment.

In each of the embodiments, the orientation of the reflection surface 11S of each pixel 11A (21A, 31A) is modified to adjust the direction of light diffracted by the pixel 11A (21A, 31A). Alternatively or in addition to this, as shown in FIGS. 30A to 30D, the direction of diffracted light from each pixel 11A (21A, 31A) may be adjusted by adjusting the length in the X direction of the reflection surface 11S of the pixel 11A as a pitch D1 to D4 of the reflection surface 11S of the pixel 11A, while maintaining its height H. The pitch is equal to the structure width described above. With respect to the pixel 11A (21A, 31A) shown in FIG. 30A, the pixels 11A (21A, 31A) of FIGS. 30B to 30D are arranged in ascending order of degree of adjustment in pitch of the reflection surface 11S.

Figures 31A, 31B, 31C, 31D:
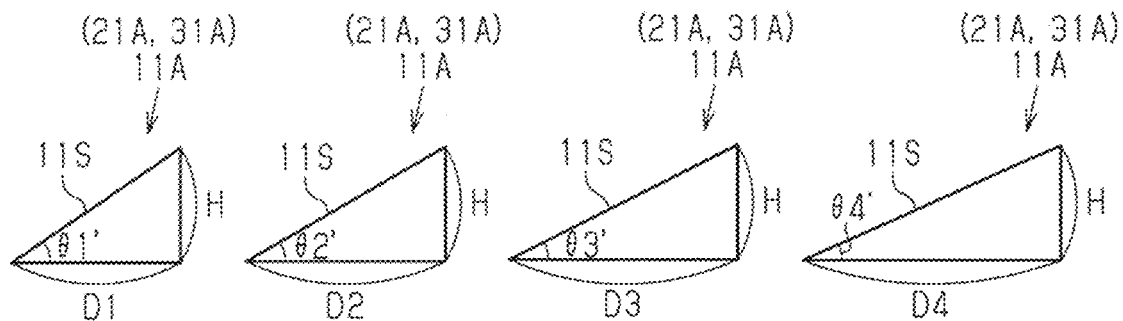
FIGS. 31A to 31D are cross-sectional views showing the cross-sectional structures of the pixels shown in FIGS. 30A to 30D.

FIGS. 31A to 31D are cross-sectional views of the pixels 11A (21A, 31A) of FIGS. 30A to 30D in the X direction. FIG. 31A is a cross-sectional view corresponding to the pixel 11A (21A, 31A) shown in FIG. 30A, and FIG. 31B is a cross-sectional view corresponding to the pixel 11A (21A, 31A) shown in FIG. 30B. FIG. 31C is a cross-sectional view corresponding to the pixel 11A (21A, 31A) shown in FIG. 30C, and FIG. 31D is a cross-sectional view corresponding to the pixel 11A (21A, 31A) shown in FIG. 30D. In this example, the reflection surfaces 11S of these four types of pixels 11A (21A, 31A) have the same height H. As the pitch of the reflection surface 11S of the pixel 11A (21A and 31A) increases from D1 to D4, the inclination angle formed by the reflection surface 11S and the display surface 10S in the pixel 11A (21A, 31A) gradually decreases from θ1' to θ4'.

That is, there is a certain interrelation between the pitches D1 to D4 of the reflection surfaces 11S of the pixels 11A and the inclination angles θ1' to θ4' of the reflection surfaces 11S of the pixels 11A in cross sections perpendicular to the display surface 10S. The different pitches D1 to D4 of the reflection surfaces 11S of the pixels 11A result in the different inclination angles θ1' to θ4' of the reflection surfaces 11S of the pixels 11A in the cross sections. The following advantage is achieved by adjusting pitches D1 to D4 of the reflection surfaces 11S of pixels 11A (21A, 31A), instead of or in addition to the orientation of the reflection surface 11S of each pixel 11A (21A, 31A). That is, in cross sections perpendicular to the display surface 10S, it is possible to have a wider variety of inclination angles θ1' to θ4' of the reflection surfaces 11S of pixels 11A (21A, 31A). In other words, the inclination angles θ of the reflection surfaces 11S may be set to a greater range of values. This configuration allows the display body 10 to display an image with multilayered gradations.

Figures 32A, 32B, 32C, 32D:
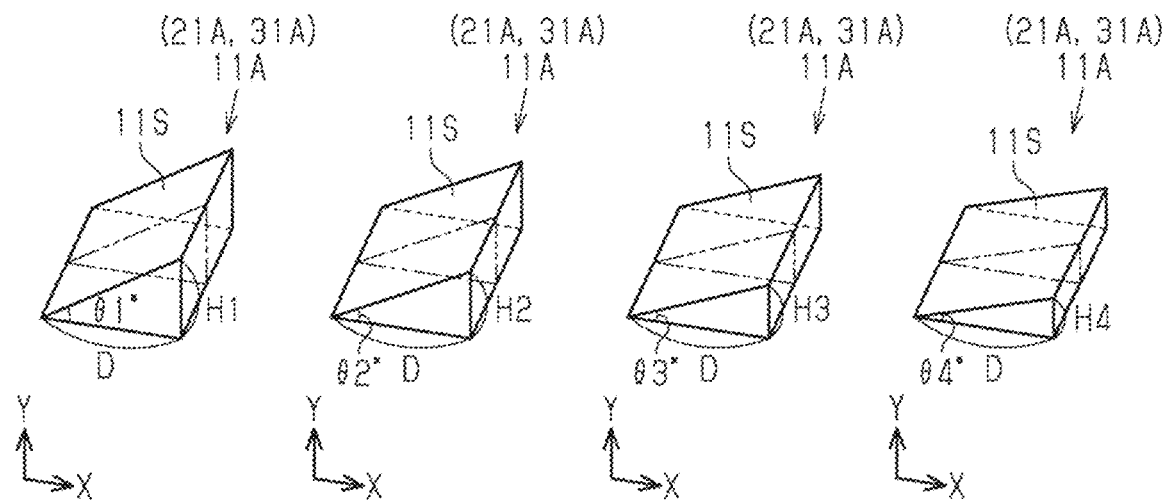
FIGS. 32A to 32D are perspective views showing the structures of pixels, which are associated with tones in the image to be displayed, in a display body of another embodiment.

Similarly, as shown in FIGS. 32A to 32D, the height H1 to H4 of the reflection surface 11S of each pixel 11A (21A, 31A) may be adjusted, while maintaining the pitch D of the reflection surface 11S of each pixel 11A (21A, 31A). With respect to the pixel 11A (21A, 31A) shown in FIG. 32A, the pixels 11A (21A, 31A) of FIGS. 32B to 32D are arranged in ascending order of degree of adjustment in height of the reflection surface 11S.

Figures 33A, 33B, 33C, 33D:
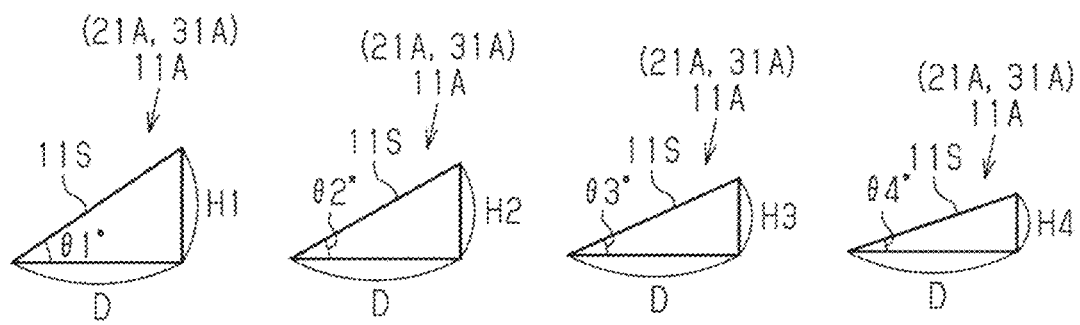
FIGS. 33A to 33D are cross-sectional views showing the cross-sectional structures of the pixels shown in FIGS. 32A to 32D.

FIGS. 33A to 33D are cross-sectional views of the pixels 11A (21A, 31A) of FIGS. 32A to 32D in the X direction. FIG. 33A is a cross-sectional view corresponding to the pixel 11A (21A, 31A) shown in FIG. 32A, and FIG. 33B is a cross-sectional view corresponding to the pixel 11A (21A, 31A) shown in FIG. 32B. FIG. 33C is a cross-sectional view corresponding to the pixel 11A (21A, 31A) shown in FIG. 32C, and FIG. 33D is a cross-sectional view corresponding to the pixel 11A (21A, 31A) shown in FIG. 32D. In this example, the four types of pixels 11A (21A, 31A) have the same pitch D. Thus, as the height of the reflection surface 11S of the pixel 11A (21A and 31A) decreases from H1 to H4, the inclination angle formed by the reflection surface 11S and the display surface 10S in the pixel 11A (21A, 31A) gradually decreases from θ1" to θ4".

That is, there is a certain interrelation between the heights H1 to H4 of the reflection surfaces 11S of the pixels 11A (21A, 31A) and the inclination angles θ1" to θ4" of the reflection surfaces 11S of the pixels 11A (21A, 31A) in cross sections perpendicular to the display surface 10S. The different heights H1 to H4 of the reflection surfaces 11S of the pixels 11A (21A, 31A) result in the different inclination angles θ1" to θ4" of the reflection surfaces 11S of the pixels 11A (21A, 31A) in the cross sections. The following advantage is achieved by adjusting heights H1 to H4 of the reflection surfaces 11S of pixels 11A (21A, 31A), instead of or in addition to the orientation of the reflection surface 11S of each pixel 11A (21A, 31A). That is, in cross sections perpendicular to the display surface 10S, it is possible to have a wider variety of inclination angles θ of the reflection surfaces 11S of the pixels 11A (21A, 31A). In other words, the inclination angles θ of the reflection surfaces 11S may be set to a greater range of values. This configuration allows the display body 10 to display an image with multilayered gradations.

In the embodiments described above, the reflection directions of the display region groups of the display body 10, 20, 30 or 40 vary continuously, so that the images formed in the reflection directions vary continuously. However, continuous varies of the image according to the reflection direction of the display body 10, 20, 30 or 40 are not necessarily required. The image may vary intermittently according to the sequence of reflection directions of the display body 10, 20, 30 or 40. For example, a motionless image may repeatedly appear and disappear. In other words, the display body may have any configuration as long as there is a certain interrelation between the images that are formed in two adjacent reflection directions among various reflection directions.

In this configuration, as described above with reference to FIGS. 15 to 16B, both of the first image P1 displayed by the first region group AS1 and the second image P2 displayed by the second region group AS2 may be perceived as two-dimensional images, and the image displayed may be switched between these two images. Further, in a configuration that switches the image to be displayed between two images, at least one of the first image P1 and the second image P2 may be a three-dimensional image, such as the three-dimensional image described for the fourth embodiment, a modification of the fourth embodiment, or the fifth embodiment. Further, the display body may have a display surface on which three or more images can be displayed.

For example, when both of the first and second images P1 and P2 are three-dimensional images, the configuration described below with reference to FIGS. 34A and 34B may be used. FIG. 34A shows an image displayed by a display body 60 when the observer OB views the display body 60 under the conditions described above referring to FIG. 16A. FIG. 34B shows an image displayed by the display body 60 when the observer OB views the display body 60 under the conditions described above referring to FIG. 16B.

That is, as shown in FIG. 34A, the display body 60 can display a three-dimensional image as the first image P1. In this modification, the first image P1 represents a banana three-dimensionally, but the image P1 may represent other object three-dimensionally.

On the other hand, as shown in FIG. 34B, when the observer OB views the display body 60 under conditions different from those in FIG. 34A, the display body 60 displays a three-dimensional image as the second image P2, which differs from the first image P1. In this modification, the second image P2 represents lemons three-dimensionally, but the second image P2 may represent other object three-dimensionally, as long as the second image P2 differs from the first image P1. Alternatively, the first image P1 and the second image P2 may be identical images.

As described above, the range of azimuth angles Φ of the reflection surfaces for displaying the first image P1 differs from the range of azimuth angles Φ of the reflection surfaces for displaying the second image P2. This allows the display body 60 to display the first image P1 and the second image P2 individually depending on the conditions under which the observer OB views the display body 60. For example, the range of azimuth angles Φ of the reflection surfaces for displaying the first image P1 is between 0° to 90° inclusive, while the range of azimuth angles Φ of the reflection surfaces for displaying the second image P2 is between 100° and 180° inclusive.

In this display body 60, the extent of the range of azimuth angles Φ of the reflection surfaces for displaying the first image P1 may be different from the extent of the range of azimuth angles Φ of the reflection surfaces for displaying the second image P2, so that the range of lightness of the first image P1 differs from the range of lightness of the second image P2. For example, the extent of the range of azimuth angles Φ of the reflection surfaces for displaying the first image P1 may be set to 10°, while the extent of the range of azimuth angles Φ of the reflection surfaces for displaying the second image P2 may be set to 80°. This allows the observer to easily recognize switching between the first image P1 and the second image P2, as compared with a configuration in which the range of lightness of the first image P1 is equal to the range of lightness of the second image P2.

For example, when the first image P1 is a two-dimensional image and the second image P2 is a three-dimensional image, the configuration described below with reference to FIGS. 35A and 35B may be used. FIG. 35A shows the image displayed by a display body 70 when the observer OB views the display body 70 under the conditions described above referring to FIG. 16A. FIG. 35B shows the image displayed by the display body 70 when the observer OB views the display body 70 under the conditions described above referring to FIG. 16B.

That is, as shown in FIG. 35A, the display body 70 displays as the first image P1 a two-dimensional image having a uniform lightness over the entire image. In this modification, the first image P1 displays the letters ABC, which is an example of a character string. As long as the first image P1 displays a two-dimensional image, the first image P1 may have a shape representing other characters, or may have a shape representing any one of number, symbol, graphics, and illustration.

On the other hand, as shown in FIG. 35B, the display body 70 can display a three-dimensional image as the second image P2. In this modification, the second image P2 represents lemons three-dimensionally, but the second image P2 may represent a three-dimensional image of another object.

The display body 70 can display the two-dimensional first image P1 and the three-dimensional second image P2. The first image P1 has a uniform lightness, so that the display body 70 can display an image that is easier to perceive than the second image P2. The display body 70 can also display the second image P2, achieving an improved aesthetic appearance as compared with a configuration that displays only an image with a uniform lightness.

As with the example described above referring to FIGS. 35A and 35B in which the first image P1 is a character string and the second image P2 is an illustration, when two images have different attributes, in other words, when two images belong to different categories, the observer OB easily notices switching between the first image P1 and the second image P2.

Figure 36A:
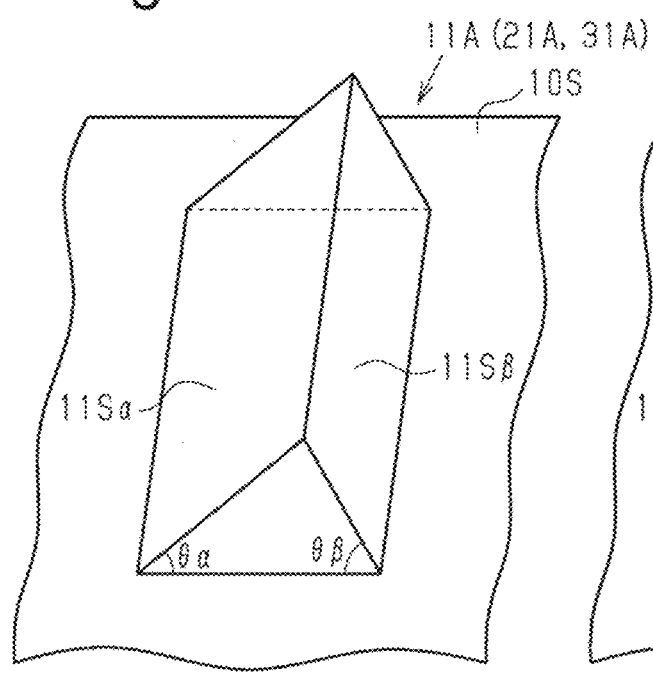
FIGS. 36A and 36B are perspective views showing the structures of pixels of other embodiments.
Figure 36B:
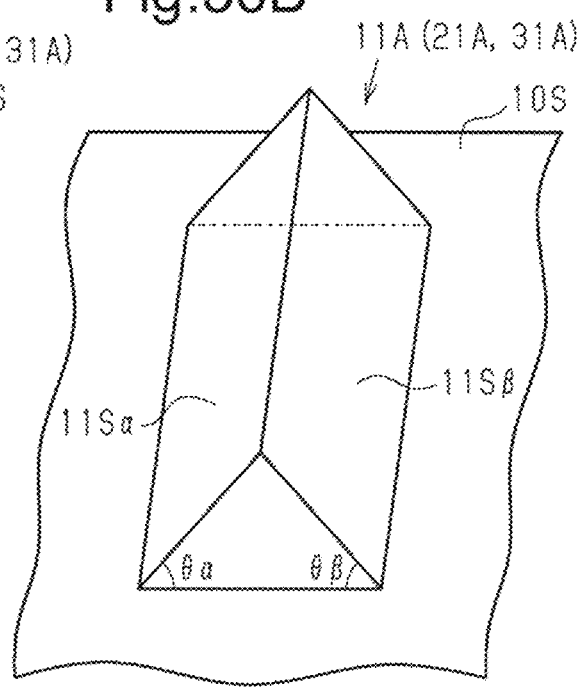

In each of the embodiments, each pixel 11A (21A, 31A) may have a plurality of inclined surfaces. In this case, as shown in FIG. 36A, inclined surfaces 11Sα and 11Sβ may form different inclination angles θα and θβ with the display surface 10S. Alternatively, as shown in FIG. 36B, the inclination angles θα and θβ formed by the inclined surfaces 11Sα and 11Sα with the display surface 10S may be equal to each other. In the example shown in FIG. 36A, the inclined surface 11Sα having the smaller inclination angle θα functions as the reflection surface for forming an image in the reflection direction. Alternatively, the inclined surface 11Sβ having the larger inclination angle θβ may function as the reflection surface for forming an image in the reflection direction. In the example shown in FIG. 36B, one of the inclined surfaces 11Sα and 11Sβ having the equal inclination angles θα and θβ functions as the reflection surface for forming an image in the reflection direction.

DESCRIPTION OF THE REFERENCE NUMERALS 10, 20, 30, 40 . . . Display body; 10S, 20S, 30S, 40S . . . Display surface; 11A, 21A, 31A . . . Pixel; 11S . . . Reflection surface; 11Sa, 21Sa, 31Sa . . . First pixel group; 11Sb, 21Sb, 31Sb . . . Second pixel group; 11Sc, 21Sc, 31Sc . . . Third pixel group; 11Sd, 21Sd . . . Fourth pixel group; 11Se, 21Se . . . Fifth pixel group; L1E, L2E, L3E . . . Unit cell; P . . . Image

The invention claimed is:

1. A display body comprising a display surface including a plurality of display region groups, each including a plurality of display regions, wherein
the display surface includes a plurality of unit cells that are arranged in a first direction and in a second direction which is perpendicular to the first direction,
each display region is a minimum unit in the plurality of display region groups, wherein each unit cell includes one display region,
each display region includes at least one reflection surface that is configured to reflect light incident on the display surface toward an area including a corresponding one of reflection directions that are associated with the respective display region groups,
at least one of the plurality of display regions has a first reflection section which has a first reflection surface of the at least one reflection surface and a second reflection section which has a second reflection surface of the at least one reflection surface,
the first reflection section is different from the second reflection section in height,
an inclination angle formed by the first reflection surface and the display surface is equal to an inclination angle formed by the second reflection surface and the display surface,
each display region group is configured to form an image unique to the display region group in the corresponding one of the reflection directions through reflection of light on the reflection surfaces in the display region group, and
when a first angle formed by the first direction and a projection direction, which is a projection normal to the reflection surface onto the display surface, is 0°, a first area occupied by the display region in the unit cell is the largest, and the closer the first angle is to 90°, the smaller the first area.

2. The display body according to claim 1, wherein the display region groups are configured to form, in two adjacent ones of the reflection directions, different images that have an interrelation between each other.

3. The display body according to claim 2, wherein the images having the interrelation, where each includes an element image, and the element images are identical in type and different from each other in at least one of position of the element images, shape of the element images, size of the element images, light and dark of the element images, and shade of the element images.

4. The display body according to claim 3, wherein the interrelation includes continuous variations, along a sequence of the reflection directions, in at least one of position of the element images, the shape of the element images, the light and dark of the element images, the size of the element images, and the shade of the element images in the images.

5. The display body according to claim 2, wherein
the two adjacent reflection directions are a first reflection direction and a second reflection direction,
the plurality of display region groups includes
a first display region group configured to form an image in the first reflection direction, and
a second display region group configured to form an image in the second reflection direction, and
the display regions of the first display region group are adjacent to the display regions of the second display region group.

6. The display body according to claim 1, wherein the plurality of reflection surfaces includes reflection surfaces that form different angles with the display surface and reflection surfaces having different orientations.

7. The display body according to claim 1, further comprising a plurality of pixels located on the display surface, wherein each display region is one of the pixels.

8. The display body according to claim 1, further comprising:
a substrate; and
a reflection layer covering the substrate,
wherein the reflection layer includes the reflection surfaces of the display regions.

* * * * *